(12) United States Patent
Xu

(10) Patent No.: US 8,578,131 B2
(45) Date of Patent: Nov. 5, 2013

(54) SUB SN, SUB SN CALLING SYSTEM AND METHOD FOR CALLING THE SUB SN

(76) Inventor: Zhaochang Xu, Shangai (CN)

( * ) Notice: Subject to any disclaimer, the term of this patent is extended or adjusted under 35 U.S.C. 154(b) by 1894 days.

(21) Appl. No.: 10/520,469

(22) PCT Filed: Jul. 8, 2003

(86) PCT No.: PCT/CN03/00543
§ 371 (c)(1),
(2), (4) Date: Oct. 4, 2005

(87) PCT Pub. No.: WO2004/006114
PCT Pub. Date: Jan. 15, 2004

(65) Prior Publication Data
US 2006/0104222 A1    May 18, 2006

(30) Foreign Application Priority Data
Jul. 9, 2002   (CN) .................................. 02 1 23948

(51) Int. Cl.
*G06F 15/00* (2006.01)
*G06F 15/76* (2006.01)

(52) U.S. Cl.
USPC .......................................................... 712/28

(58) Field of Classification Search
USPC .................................................. 712/28, 244
See application file for complete search history.

(56) References Cited

U.S. PATENT DOCUMENTS

| | | | |
|---|---|---|---|
| 4,099,230 A * | 7/1978 | Mead | 714/38.12 |
| 5,574,931 A | 11/1996 | Larue et al. | |
| 5,958,036 A * | 9/1999 | Burns et al. | 710/262 |
| 5,999,976 A | 12/1999 | Schmueli et al. | |
| 6,088,511 A * | 7/2000 | Hardwick | 717/149 |
| 6,185,676 B1 * | 2/2001 | Poplingher et al. | 712/239 |
| 6,427,206 B1 * | 7/2002 | Yeh et al. | 712/239 |
| 2002/0103847 A1 * | 8/2002 | Potash | 709/107 |
| 2003/0172215 A1 * | 9/2003 | Franke et al. | 710/264 |

* cited by examiner

*Primary Examiner* — Corey S Faherty
(74) *Attorney, Agent, or Firm* — Birch, Stewart, Kolasch & Birch, LLP

(57) ABSTRACT

This invention is involving the creation of a sub-sequence net (hereafter briefly as Sub SN). The Sub SN is a kind of sequence net encapsulation that includes sub-routine structure of N+1 single machines. Based on the fact that the sequence net call instruction of sequence net call function in the environment of sequence net computers of this invention is a single machine instruction which can call the operation of a Sub SN comprising N+1 branch programs. In N+1 branch programs, the sequence net call instruction calls Sub SN devices and realizes the call of sequence net. In this invention, grade call and sequence call of sequence net are created to meet requirements of random events and ordered events of models.

21 Claims, 10 Drawing Sheets

In sequence net call, the operations of SNCDs at clock Hi

| I | II | | III | | IV | |
|---|---|---|---|---|---|---|
| | H0 | | H1 | | Hint | |
| | 1 | 0 | 1 | 0 | 1 | 0 |
| SNCD receives sequence net call instruction It is the request machine | sending initiation level to bus 402 | checking level from bus 402 for initiation of entire system | send weight of this machine to data bus | Read weight of entire system from data bus. Entering into temp. register, Compare with weight of this machine. HVBOR of temp. register is equal to weight of this machine, the call is valid. | Call of this SNCD is valid. Call parameter send to data bus. | Read data bus, enter in temp. register. Send interrupt level to computer connected with SNCD. |
| ditto | ditto | ditto | send weight of this machine to data bus | Read weight of entire system from data bus. Entering into temp. register, Compare with weight of this machine. HVBOR of temp. register is higher than weight of this machine, the call is invalid. | Call of this SNCD is invalid. Send 0000 to data bus. | ditto |
| Not request machine | no operation | ditto | send 0000 to data bus | Read weight of entire system from data bus, Entering into temp. register. No call request, no comparison. | Send 0000 to data bus. | ditto |

Fig.4C

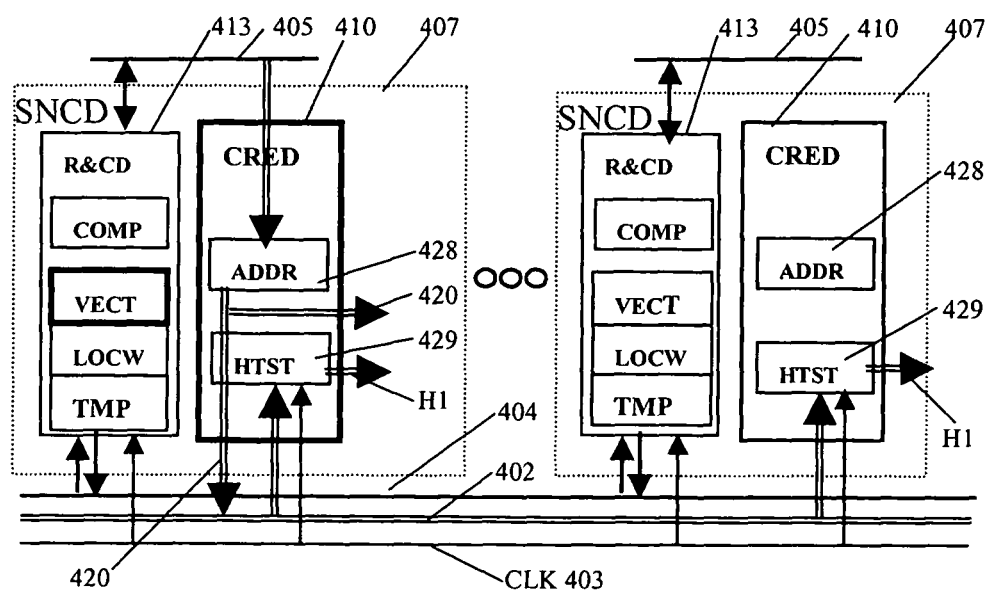

Fig.4D

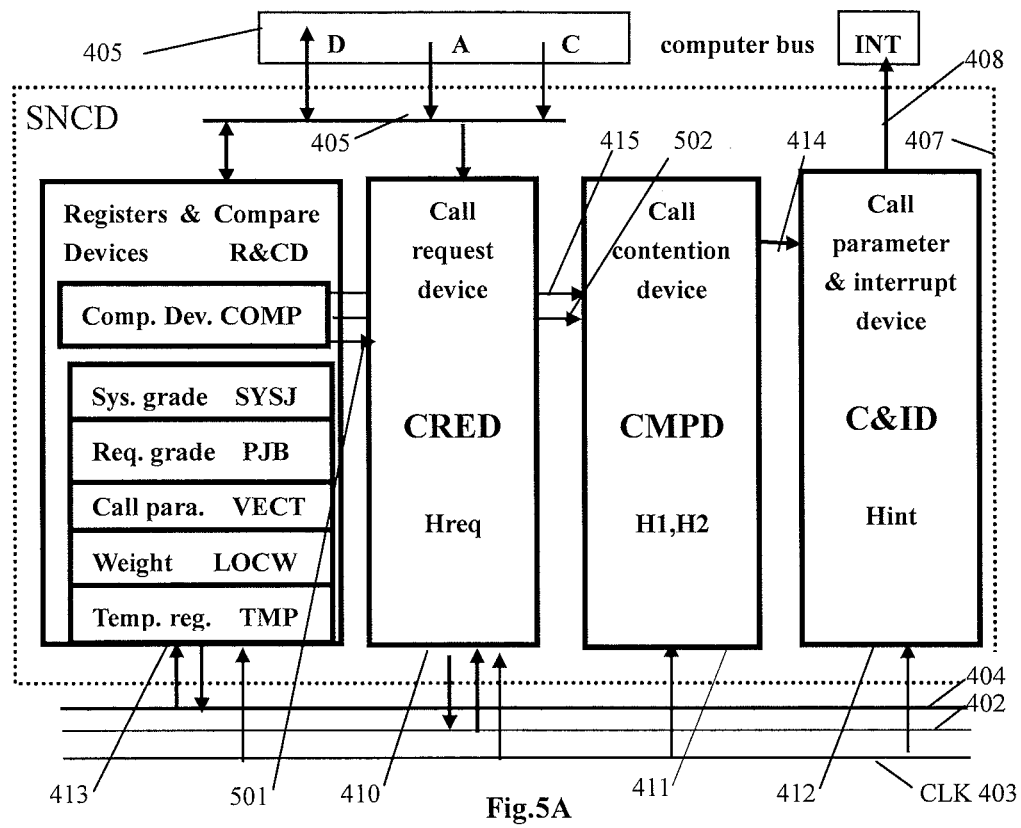

Fig. 5A

In grade call of sequence net, the operations of SNCDs at clock H

| I | | II | | III | | | | IV | |
|---|---|---|---|---|---|---|---|---|---|
| Hreq | | H0 | | H1 | | H2 | | Hint | |
| 1 | 0 | 1 | 0 | 1 | 0 | 1 | 0 | 1 | 0 |
| SNCD receives sequence net grade call instruction of request machine | Request grade greater than system grade, request valid | Initiation level to bus 402 | Check initiation level on 402, at least a leading edge | Send request grade to data bus | Read request grade of entire system from data bus. Send to temp register. Compare with request grade of this machine. The HVBOR are equal. Call valid. | Send weight of this machine to data bus. Write the HVBOR of temporary register into system grade register | Read weight of entire system from data bus. Send to temp. register. Compare with weight of this machine. The HVBOR are equal. Call valid. | SNCD valid. Send call parameter to data bus | Read data bus and send to temp. register. Send interrupt level to computer |

Fig. 5B

| | | | | | | | | | |
|---|---|---|---|---|---|---|---|---|---|
| ditto | Request grade greater than system grade, request valid | ditto | ditto | Send request grade to data bus | Read request call of entire system from data bus into temp. register. Compare with request grade of this machine. The HVBOR are equal. Call valid. | Send weight of this machine to data bus. Write the HVBOR of temp. register into system grade register | Read weight of entire system from data bus into temp. register. Compare with weight of machine. Weight of this machine is low. Call invalid | send 0000 to data bus | ditto |
| ditto | Request grade greater than system grade, request valid | ditto | ditto | Send request grade to data bus | Read call request of entire system from data bus into temp. register. Compare with request grade of this machine. The HVBOR are not equal. Call invalid. | Send 0000 to data bus. Write the HVBOR of temp. register into system grade register. | Read the weight of entire system into temp. register. Already in status of invalid call. No further comparsion to be made | ditto | Ditto |
| ditto | Request grade smaller than system grade, request invalid | No operation | ditto | Send 0000 to data bus | Read request call of entire system from data bus. Send to temporary register. | ditto | ditto | ditto | ditto |
| SNCD is not request machine | No operation | ditto | ditto | ditto | ditto | ditto | ditto | ditto | ditto |

Fig.5B (continued)

In sequence call of sequence net, operations of SNCDs at clock H

| I | II | | | III | | | | IV | |
|---|---|---|---|---|---|---|---|---|---|
| | Hreq | H0 | | H1 | | H2 | | Hint | |
| | 1　0 | 1 | 0 | 1 | 0 | 1 | 0 | 1 | 0 |
| SNCD receive sequence net sequence call instruction, it is request machine | Number of machine equal to number of NEXT, Call valid | Send initiation level to bus 402 | check for initiation level of entire system on 402 | Sequence call, send 0000 to data bus | Read Sequence features of entire system from data bus, Send 0000 to temp. register. Temp. register are zero. Type of sequence call | No operation | | SNCD valid Send call parameter to data bus | Read data bus. Send to temp. register. Send interrupt level to computer connected to SNCD. |
| SNCD receive sequence net sequence call instruction, it is request machine | Number of this machine not equal to NEXT, Call invalid | No operation | Ditto | No sequence call, send 0000 to data bus | ditto | No operation | | SNCD invalid, send 0000 to data bus | Ditto |
| SNCD is not request machine | No operation | ditto | Ditto | Ditto | ditto | No operation | | Ditto | Ditto |

Fig.5D

SUB SN, SUB SN CALLING SYSTEM AND METHOD FOR CALLING THE SUB SN

TECHNICAL FIELD

This invention relates to multiple computer technology, and particularly, to sequence net computer technology.

BACKGROUND

Facing the problems used to be existed in the parallel processing technology, previous invention (China patent pending number 00119472.0) had found the match of numbers of N+1 flows and N+1 sequences, and stated the matching of flow numbers and sequence numbers as necessary conditions of utility. Meanwhile, as for the goal of utility, previous invention of sequence net computers created the sequence net computer structure of N+1 programs. Sequence net computers support sequence net of N+1 programs without parameter constraints and the first step of utility was realized.

The utility of sequence net computers is further developed in this invention. This invention further converts the encapsulation capability of parallel programs of sequence net to sub-sequence net modules (hereinafter as Sub SN) which are featured with call capability and automatic return. Besides, multiple sequence net combination can be established with Sub SN call structure, so that the adaptability of sequence net computer structure and application models are further developed.

In FIG. 1, this invention set up the device structure of call sub-routines of single machine. In FIG. 2, sequence net structure of previous technology is shown and Sub SN is established. FIG. 3 and the figured followed are used to describe the structure of call Sub SN.

FIG. 1A is the sub-routine call in single machine. "Call" and "return" are two computer instructions, are elements of embedded structure of processing programs. In FIG. 1A, the call instruction 100 of program 101 can realize the call of a sub-routine 102. Call instruction 100 is embedded in original program 101, and contains entry port address parameters of sub-routine 102. After instruction 100 executed, the program is entering sub-routine 102. After the return instruction of sub-routine 102 was executed, the program is returned to original program 101 and the operation goes on.

Call instruction can be resolved into two parameters, call position and call parameter. Call position denotes the position in original program and is kept an ordered relation with other instructions in original program, irrelevant to sub-routine. Call parameter denotes the entry port address of sub-routine and is irrelevant to the structure of original program. Sub-routine module contains three parameters, i.e., entry port address, program body, and return instruction. Among which, the combination of "program body" and "return instruction" forms sub-routine. Hence, the process of "call instruction+program body+return instruction" is called "call sub-routine". The hardware supporting call sub-routine is named call sub-routine device.

The actual construction of call sub-routine device is that the operations from single machine programs to call instructions and the operations of producing call position and call parameters. The operation on position is to transfer the contents of instruction counter to stack area. The operation of call parameters is to send parameters to instruction counter. Then the next instruction will take the parameter as address and to execute. When the sub-routine concluded, a return instruction was executed and the data in the stack are sent to instruction counter so that the next instruction will take it as address and execute. This process is corresponding to the return of original program and the execution continues. Obviously in the structure of single machine CPU, the construction of call sub-routine devices is diversified and some of them are shared by other instructions. In this invention, they are combined together and a unique featured sub-routine device is defined.

External features of call sub-routine are call position and sub-routine modules. The call instruction and called program (i.e. entry port address of call parameter and sub-routine) are connected as internal connection.

From the view point of original program, a call instruction can activate sub-routine device, call instruction provide the device with two parameters, position and parameters. In accordance with the position, call structure sub-routine device is to protect program address and to assign sub-routine entry port on the basis of call parameters. After sub-routine executed return instruction, call sub-routine processing program returns to its previous position.

The call program and return instruction of call sub-routine device use appropriate software and instruction hardware structure commonly used in single machine. Hence, the parts specific to call sub-routine device are the hardware structures including those used in call instruction, parameter transferring, and sub-routine initiation phase.

The informational relations between call sub-routine parts are "call position" of call instruction used to initiate sub-routine devices, "call parameters" used to transfer information inside call sub-routine devices and indicate the connection with sub-routine modules, and "sub-routine" including return instruction for returning back to original program. "Call position—call parameter—sub-routine" is the procedures of signal processing inside sub-routine devices.

FIG. 1B and FIG. 1C showed the relations between call position, call parameter, and sub-routine. From the standpoint of information, FIG. 1A showed the embedded relations between single machine call sub-routine devices. FIG. 1B showed that in the same call position of 108, different sub-routines can be called in different conditions of call parameter. FIG. 1C showed that in different call positions of 108, same sub-routine can be called in same condition of call parameter.

FIG. 1D is the schematic diagram of call sub-routine structure based on the description of call information. In single machine environment, call position, call parameter, and sub-routine module can form the structural characteristics, as shown in FIG. 1D. Among which, 108 is call position, 102 is sub-routine module, and 104 is a virtual bus structure. The function of virtual bus 104 is to transfer call parameter and realize the connection of position and sub-routine.

Call position is embedded in program 105. FIG. 1D indicated clearly the structural hierarchical relation between the set of call position 108 and the set of sub-routine 102. Of course, this hierarchical relation is just the relation in program structure and is serial in nature by the sense of time. Among which, program 105 includes call instruction which activates call sub-routine devices and initiate a sub-routine in the set of program 102. The set of call position 108 and the set of program 102 constituted the Client-Server structure and indicated that call sub-routine device is the core of Client-Server structure which supports single machine programs.

FIG. 1D is a method of describing call sub-routine device from the standpoint of information. It emphasized the connection structure of call parameter transfer—virtual bus. It has the same function as indicated in FIG. 1A. However, in multiple machine environment, there must be external connections which seems similar to the single machine representation method of FIG. 1D.

Call sub-routine device is a shared hardware structure and must be operated in time division. The operating process of call sub-routine device comprises three aspects:

call position—call parameter—sub-routine module

Among which, call position initiates call sub-routine device. Call parameter is the object to be transferred. Sub-routine module is an operational structure. During entering, there is a position protection, and sub-routine module is incorporated with return instruction.

FIG. 1E is the usual technique of hardware interrupt. Interrupt signal 106 is connected to the interrupt pin of computer, CPU 107 so that computer CPU 107 can be turned to interrupt program.

As indicated in FIG. 1F, the effects on the program structure made by interrupt are the quit of original program 101, quit position protected and interrupt program 109 entered, interrupt program 109 quitted with interrupt recovery instruction, and recovered operation of original program 101. Obviously, interrupt structure is similar to call instruction in many aspects. Among which, interrupt vector is similar to call parameter, interrupt program is similar to sub-routine. The discrimination between interrupt and call lies on the fact that interrupt position is of no relation with interrupted program, whereas call position has an ordered relation with the contextual events of original program.

There are three elements in the process of executing interrupt structure:

Interrupt position—interrupt hardware structure externally initiated, to locate the interrupt location of program.

Interrupt vector—indicates the entry of interrupt program.

Entry of interrupt program—vector interrupted program, recovering original program by interrupt recover instruction.

As for the computer hardware, the characteristics of interrupt is similar to that of call instruction and featured with the effects of embedded programs except that the front ends of processing are different. This fact denotes that the most hardware parts of call instruction device can be shared by both call instruction and interrupt. Whereas on the processing on program device before entering call sub-routine, the difference between them had been treated separately as the processing off known ordered events and external random events. Therefore, it is evident that call sub-routine device of single machine is shared by both ordered events and random events.

FIG. 2A is the schematic diagram of sequence net and encapsulation. The sequence net computer in previous invention is a kind of parallel program with distributed structure (China Patent Pending No. 00119472.9). As indicated in FIG. 2A, it is featured with distributed data token structure 204 and N+1 (in the figure N=3) program flows 210Ps, 211P1, 212P2, 213P3. Distributed data token 204 performs internally the consistency operation of data and token. Among which, each distributed data token 204 comprises a consistency token instruction 201, a source data token instruction 202, and multiple-targeted data token instruction 203. Program P1-P3 are composed with source data token instruction 202 and target data token 203. Consistency program Ps is composed by consistency token instruction 201. The read and write operation made to data token instruction by each program is constrained in local area.

Sequence net is performed by operations independently driven by N+1 programs. The principles of operations are as follows:

1. In case of specific instruction of write-data, program writes data into data token, and producing a source token. The program is going on. Therefore source data token of sequence net is generated.

2. In case of specific instruction of read-data, program reads data from local data token. Test to token with same address is performed by hardware. If valid, the program goes on. If invalid, the program is suspended until the appearance of valid data. Hence, target data token of the sequence net is generated.

3. In case of consistency instruction, data token consistency operation of the distributed data token is executed. Consistency operation is the transmission of data and token to destination. The consistency instruction tests the token value in consistency operation (in transmission). If the test is invalid, consistency instruction will be repeated automatically until the appearance of valid source (data) token. If the test is valid, the consistency instruction quits and the program is going on continuously. Therefore, the consistency token of sequence net is generated.

Sequence Net Encapsulation

By definition of sequence net, interconnection and synchronization of multiple programs can be done within the sequence net itself Therefore, if N+1 programs of sequence net went into operation, sequence net can perform the computation for sequence net itself and no help from outside was needed. Hence sequence net can be encapsulated in the form of N+1 program sections.

Interrupted Characteristics of Sequence Net

By the working principle of sequence net, sequence net is a parallel program. Suspension occurred in any branch will cause quit of sequence net. However, no fault will be occurred in sequence net. Once the program is recovered, the sequence net can be going on continuously. Therefore interrupt in any branch of sequence net can be allowed. When N+1 branches are interrupted simultaneously and a new sequence net is constituted by the N+1 interrupted programs, then it is obvious that a sequence net can be interrupted by another sequence net.

Hence, sequence net is featured with two important characteristics of operations:

Capable of being encapsulated: when N+1 sequence net branches are initiated, the sequence net can perform by itself the functions of parallel modules.

Capable of being interrupted: Interruption to any sequence net in operating condition by another sequence net is allowed. The correctness of sequence net operation is not affected by interrupt.

It had been indicated in previous invention that in the past most operable parallel processing computers could actually support one parallel level sequence net. It is evident that parallel processing computers could not meet requirements of diversified application models, So its applications are seriously constrained. Sequence net of this invention has inaugurated the support to multiple sequence nets. The interconnection between multiple sequence nets is realized by the structure of call Sub SN.

SUMMARY

One aim of this invention is to establish sub-sequence net, (hereafter briefly as Sub SN). Its characteristic feature is composed of N+1 single machine sub-routine. Thus, it is possible to use the sub-routine structure of single machine as the structure of call Sub SN.

Another aim of this invention is to create the sequence net call function in the environment of sequence net computers. This invention is the first time to create call function of sequence net. It creates a new call instruction of sequence net.

The sequence net call instruction is single machine instruction and is able to call the operation of a Sub SN (N+1 branches).

"Call Sub SN device" is stimulated by sequence net call instruction, and the call of sequence net is realized. Call Sub SN maintained three elements of "call position—call parameter—Sub SN". It is started by a call instruction of single machine, whose call parameters are broadcasted to N+1 elements as call entry address of N+1 branch programs of sequence net. During the entry of N+1 branch programs, on site protection does exist. Branch programs are quitted by return instruction.

The aim of this invention is to create two modes of application, grade call of sequence net and sequence call of sequence net. Two characteristic features of utility of sequence net computer are sequence net and the call of sequence net. In order to adapt the ordered events and random events of the model, this invention also creates two modes of call request (call application), grade call of sequence net and sequence call of sequence net.

BRIEF ILLUSTRATION OF DRAWINGS

In this text of describing structure of this invention, the terminology used in this text are consolidated. The same serial number and the same alphabet used in all drawings have been featured with same structure and meaning. The contents of this invention such as unique methods of characterization and methodology, and the aims of this invention can be more precisely understood with the aid of descriptions to the implementation example and annexed figures of this invention. Among which:

Figure 3A:
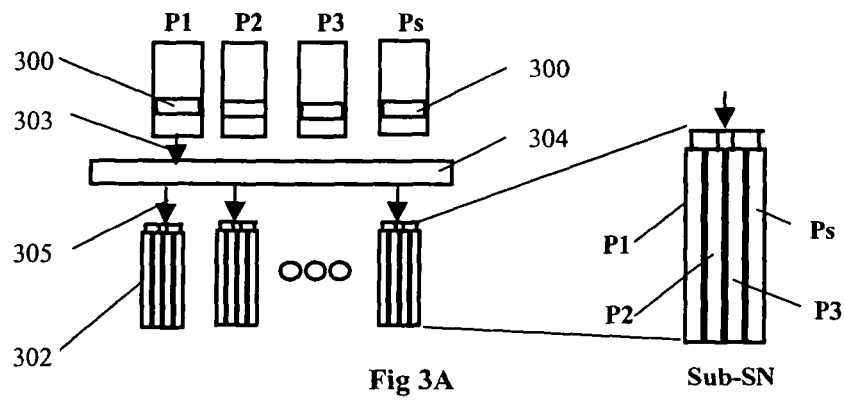
FIG. 3A is the structural diagram of call Sub SN device
Figure 3B:
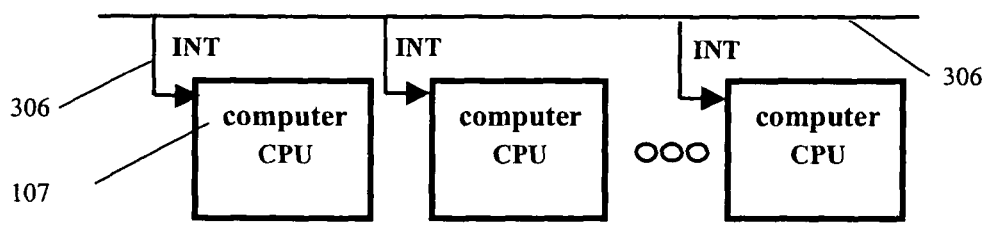
FIG. 3B is the schematic diagram of hardware structure of call sequence net by the way of interrupt.
Figure 3C:
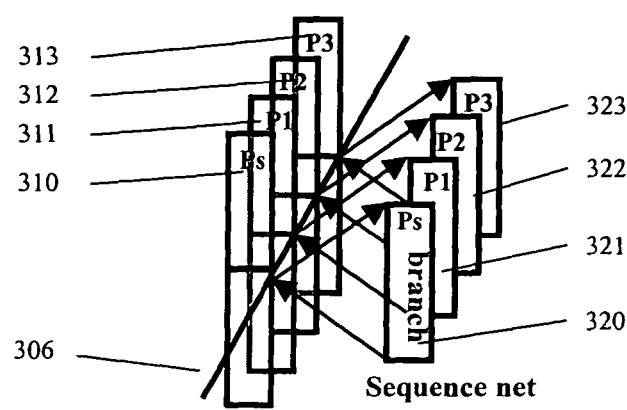
FIG. 3C is the schematic diagram of program structure of call sequence net by the way of interrupt.
Figure 3D:
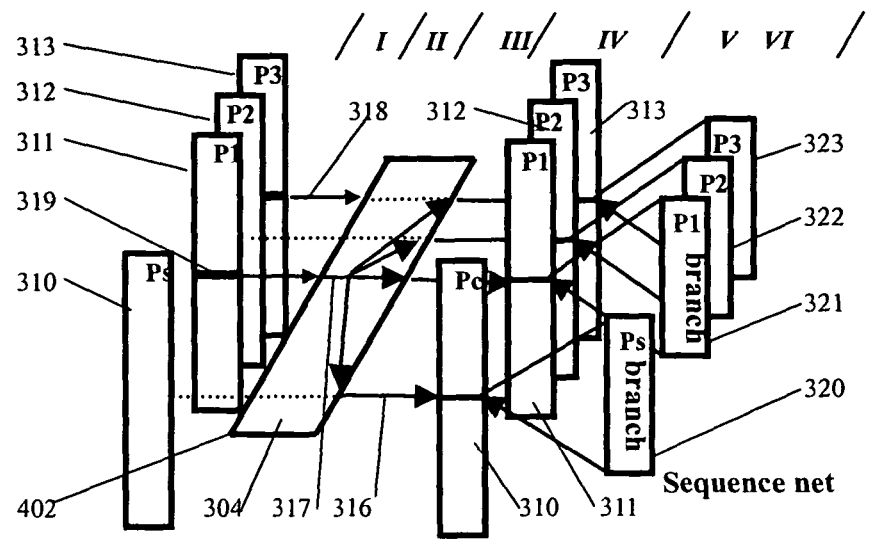

FIG. 3D showed the relation between call Sub SN device and program.

Figure 3E:
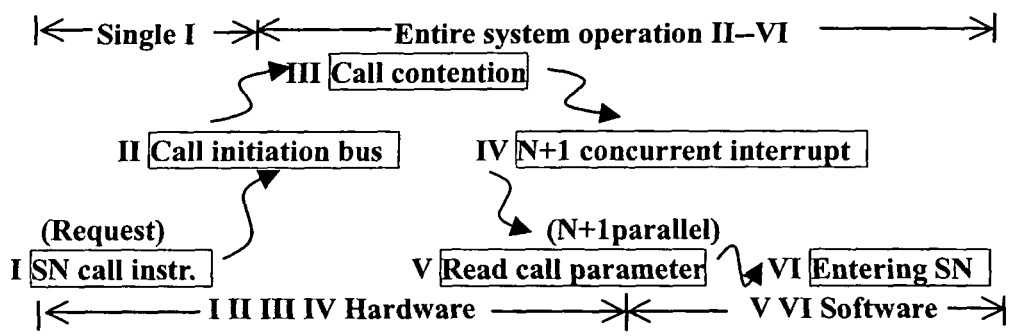

FIG. 3E is the flow diagram of procedures of call Sub SN device.

Figure 4A:
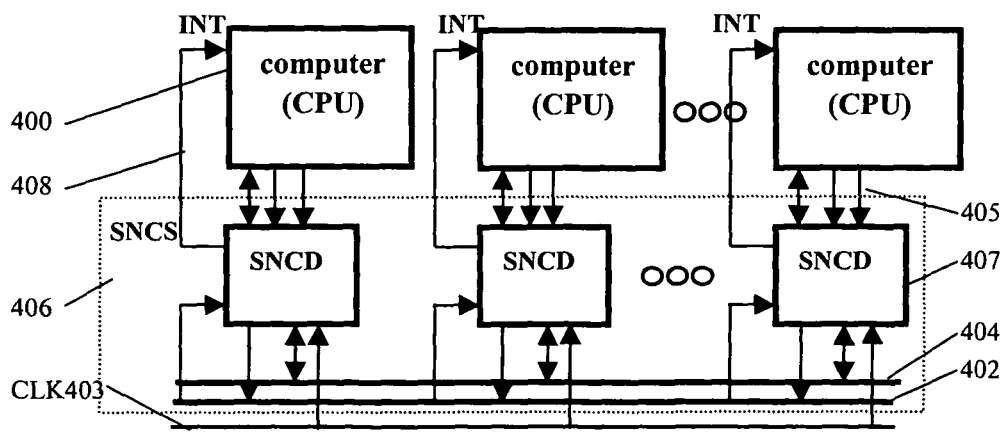

FIG. 4A is the structural diagram of sequence net call system SNCS.

Figure 4B:
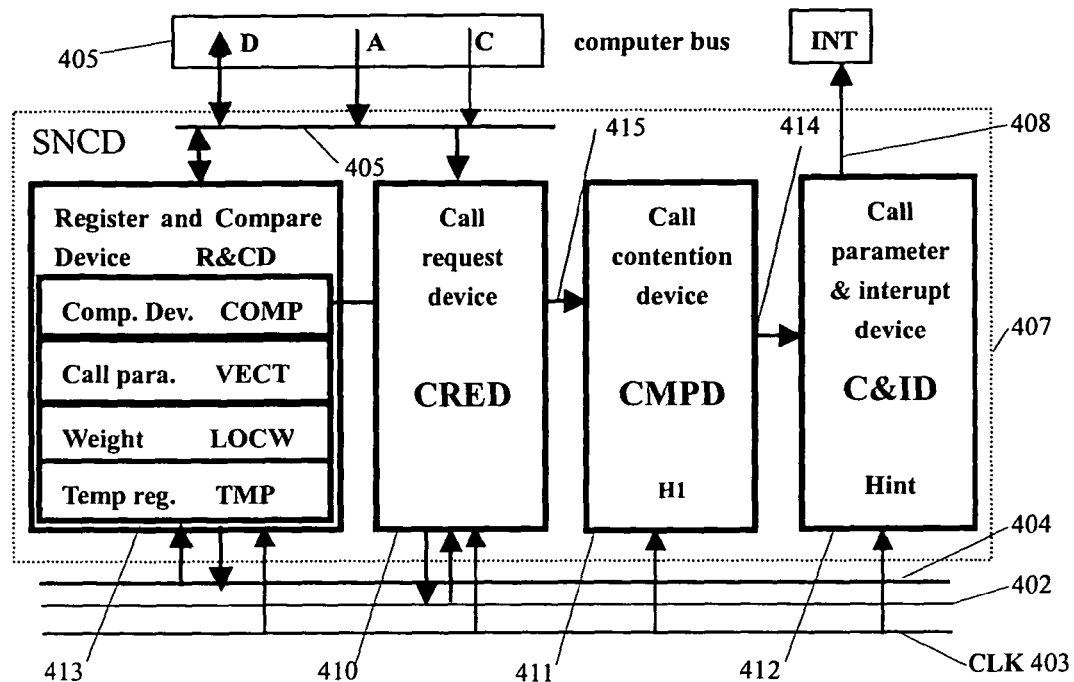

FIG. 4B is the structural diagram of sequence net call device SNCD.

FIG. 4C is the flow table of sequence net call device SNCD.

FIG. 4D is the diagram of cooperative control of CRED devices.

Figure 4E:
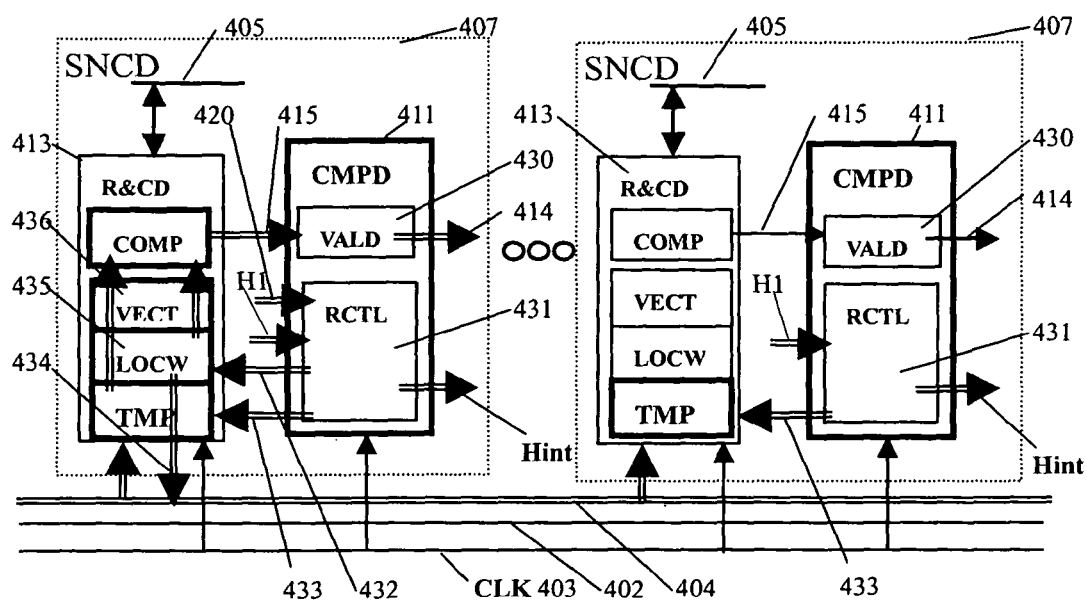

FIG. 4E is the cooperative control of CMPD device.

Figure 4F:
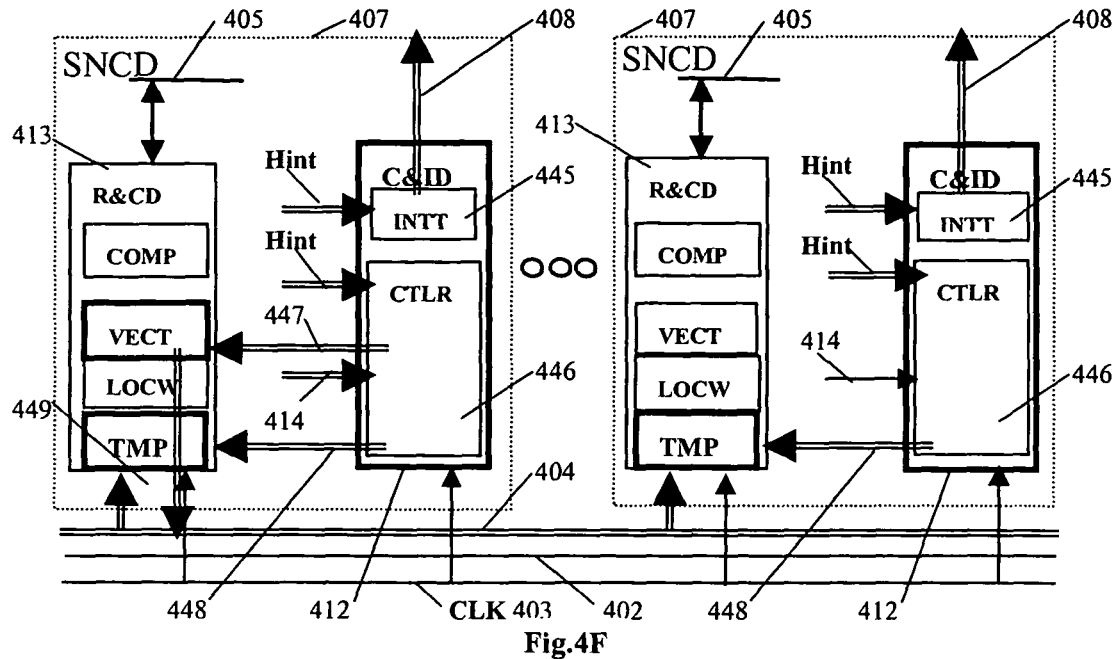

FIG. 4F is the cooperative control of C&ID device.

Figure 4G:
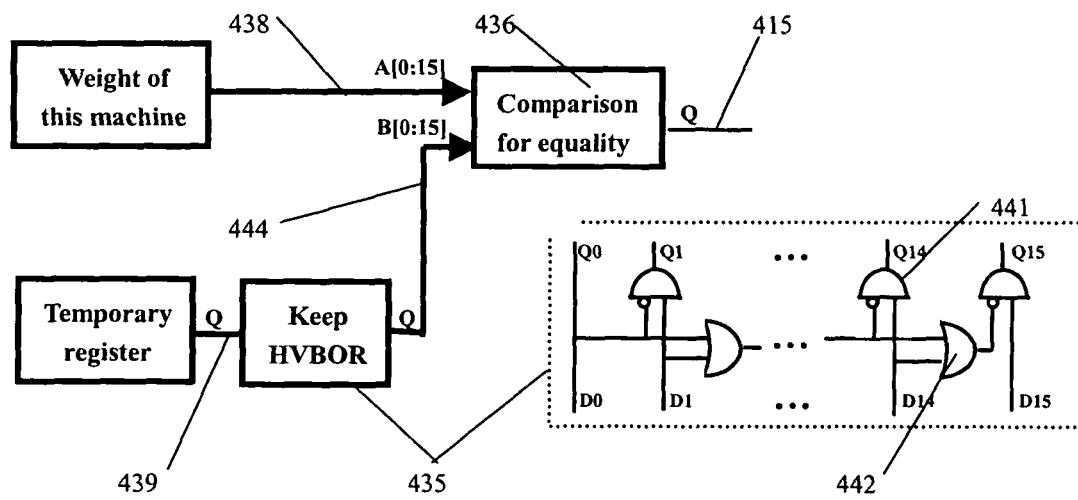

FIG. 4G is the structure of comparison device in R&CD device.

FIG. 5A is the structure of sequence net grade call of this invention.

FIG. 5B is the table of operations of sequence net grade call of this invention.

Figure 5C:
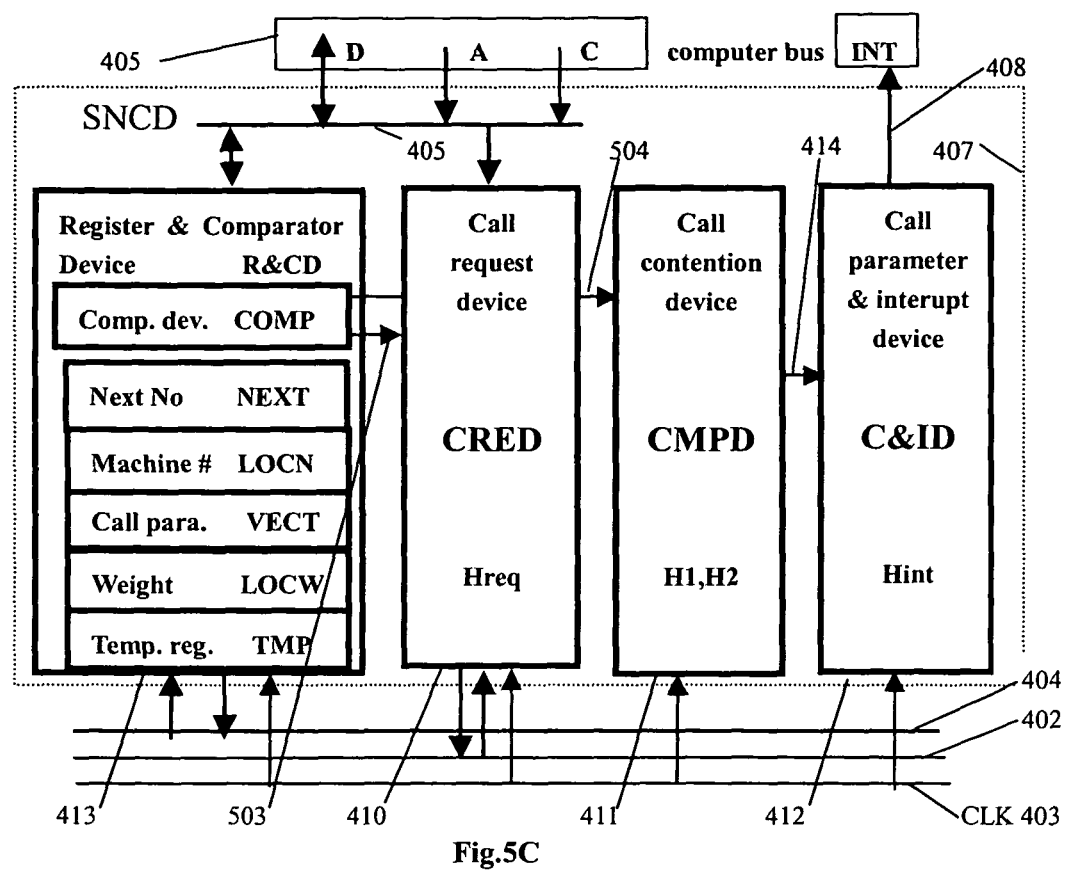

FIG. 5C is the structure of sequence net sequence call of this invention.

FIG. 5D is the table of operations of sequence net sequence call of this invention.

PREFERRED EMBODIMENTS

Figure 2A:
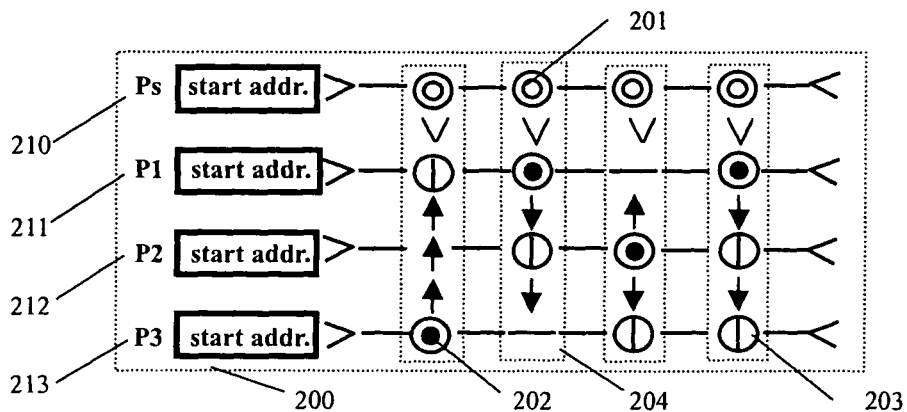
FIG. 2A is the schematic diagram of sequence net and encapsulation.
Figure 2B:
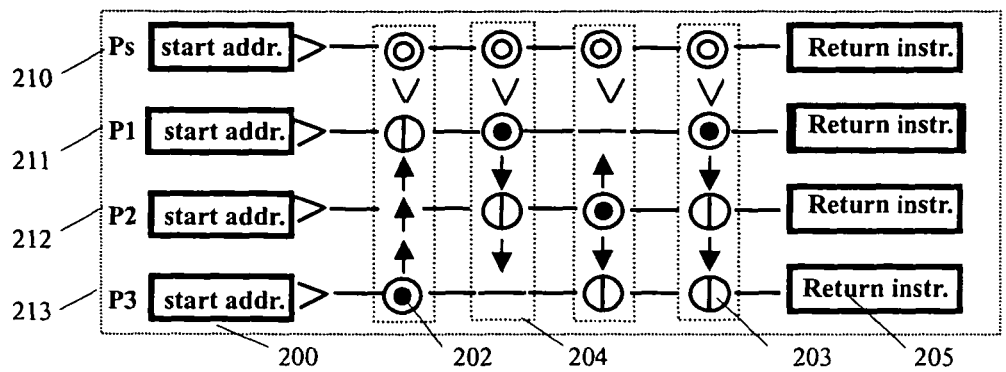
FIG. 2B is the schematic diagram of Sub SN structure.

FIG. 2B is the schematic diagram of Sub SN structure. The sequence net encapsulation is the encapsulation of parallel programs. If each sequence net branch program of sequence net encapsulation is ended with return instruction 205 of single machine, then this sequence net encapsulation is called Sub SN. Sub SN is a special version of sequence net encapsulation. Because the branch program of sequence net is corresponding to sub-routine, Sub SN is structurally equivalent to the combination of N+1 sub-routines. Its characteristics are:

Entry port address of N+1 programs, each branch program is ended with return instruction (i.e. address protection is needed during entry).

As the characteristics of sequence net operation, once the Sub SN enters, N+1 branch programs are featured with on site protection. In the end of sequence net branch programs, it is easily performed by N+1 independent single machine return instructions to recover the sequence net operation before call operation. It denotes that the return structure of Sub SN can use the structure of call sub-routine device of N+1 single machines. The encapsulation of Sub SN is a direct extension of encapsulated version of N+1 branch programs.

FIG. 3A is the structural diagram of call Sub SN device. This is the structural diagram of Sub SN called by sequence net call instruction in multiple machine environment. It adopted method of information based representation similar to FIG. 1D and three elements are included, call position, call parameter, and Sub SN.

Sequence net call instruction is in the format of single machine and includes call position 300 and call parameter. When the sequence net call instruction is in operation, sequence net call position and sequence net call parameter are produced. Call position 300 is the position of single machine program. Each call parameter is corresponding to one Sub SN 302. Call parameter is the interconnection of call position 300 and Sub SN 302 and call bus device 304 is formed. Call bus device 304 performs the connection of call position of single machine to N+1 Sub SN branches. The structure realizing call position—call parameter—Sub SN is called "call Sub SN device".

From the view point of the original program, a sequence net call instruction of single machine can activate Call Sub SN device. Call instruction should provide two parameters, call position and call parameter to N+1 branch programs. When branch programs are supplied with two parameters, call position and call parameter, each cell computer is actually to execute the call of a sub-routine and the return, under the support of single machine call sub-routine device.

In the environment of multiple machines, the above mentioned "Call instruction should provide two parameters, call position and call parameter to N+1 branch programs" is realized by the call of bus device 304. The call bus device 304 is not a simple structure of interconnection. It should perform call parameter broadcasting and initiate N+1 sequence net branch programs.

The input for call of bus device 304 comes from sequence net call instruction 300 of the program. The output is the operation of sequence net N+1 branch programs. Therefore, call bus device 304 is with a process of converting single machine to parallel machines. In the meantime, sequence net call instruction is single machine instruction, but probably with the possibility of concurrent multiple sequence net call instruction. Whereas call Sub SN is a structure all around in nature, then it can only to process one object in each time, Hence, to call bus device 304, there is a contention structure for multiple sequence nets call instructions.

Figure 1A:
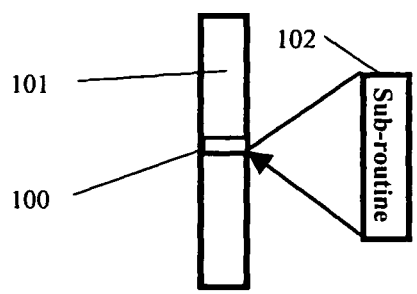
FIG. 1A is the structural characteristics of call sub-routine in single machine.
Figure 1B:
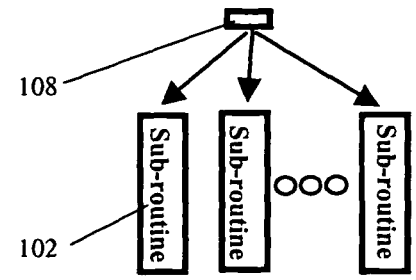
FIG. 1B is the schematic diagram of different sub-routine called by different parameters.
Figure 1C:
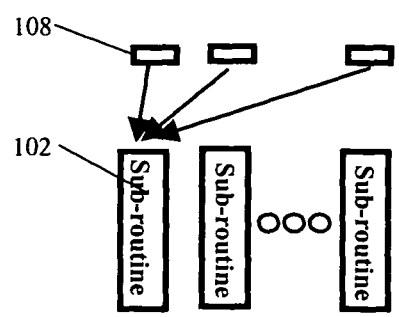
FIG. 1C is the schematic diagram of the same sub-routine called by multiple call positions.
Figure 1D:
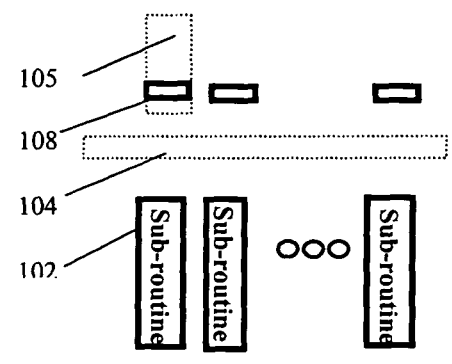
FIG. 1D is the schematic diagram of call sub-routine structure based on the description of call information.
Figure 1E:
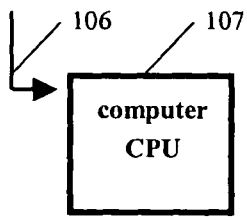
FIG. 1E is the schematic diagram of hardware interrupt.
Figure 1F:
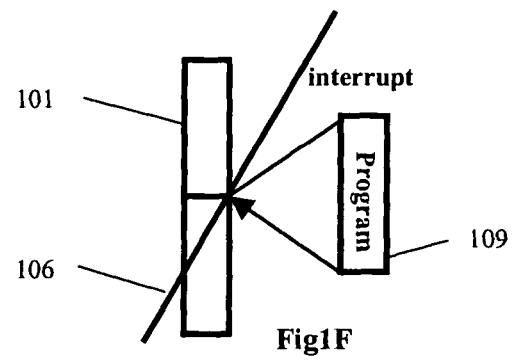
FIG. 1F is the schematic diagram of program structure of interrupt operation.

Because there is contention, the structure of call bus device must be at the same time including the entry of N+1 call position 300 and the contention thereof, as indicated in FIG. 3A. In single machine, serial type structure automatically eliminates the contention in calls. Multiple call instruction 108, as indicated in FIG. 1D will not be occurred in concurrent, so no contention occurs.

As compared with single machine call sub-routine, the call Sub SN of multiple machines is also initiated by (single machine) call instruction. In the transferring process of call position and parameter, there are conversions of serial type to parallel operation and the management of contention occurred in concurrent call instruction. Whereas Sub SN is the combination of single machine sub-routine, within which the interconnected data of sequence net is done within Sub SN and is irrelevant to call structure.

Sequence net call instruction demands new design of hardware structure. Sequence net call instruction still contains two parameters, sequence net call position 300 and sequence net call parameter. Whereas in the users interface, the concept remains still the traditional instruction "Call" and "Return".

The procedures of call of Sub SN device are as follows:
When program is going to sequence net call position 300, call position 300 and call parameter are sent via 303 to call bus device 304. This procedure is local operations of each computer.

Call bus device 304 may receive initiation level of multiple sequence net call position 300. With the internal contention of device 304, one sequence net call is arbitrated valid and other sequence net calls are screened out.

Through 305, call bus device 304 is broadcasting valid sequence net call parameter to various distributed elements. One sequence net call parameter is corresponding to one Sub SN 302.

Every sequence net branches has on site protection when they entered the Sub SN 302.

Each branch programs of Sub SN is featured with return instruction and quitted from sequence net.

The operational procedures of call Sub SN device have three elements:
call position—call parameters—Sub SN Call position initiates call Sub SN device; call parameter is the content transferred in the call Sub SN device; and Sub SN is featured with structure of parallel operations. Each branch of Sub SN has on site protection when they are initiated and quitted by return instruction. Among which, the structure of call Sub SN device also includes: (1) hardware for processing call contention, and (2) structure for transferring call parameter from single machine to multiple machines.

The differences between call position of call Sub SN and single machine call position are as follows:

In multiple machine system, a call position has to be featured with two parameters, "machine number" and "position in program". Contention rules of call-sequence net device can solve the problem with different machine number, the user can take advantage of easier programming without the needs of machine number in the call Sub SN instructions. For the sequence net call instruction that failed in contention, the system can establish a new application of processing and users programming is not needed.

FIG. 3B is the schematic diagram of hardware structure for interrupt call Sub SN. The final operation of call Sub SN is to initiate the branch programs of Sub SN. As indicated in FIG. 3A of this invention, protection to the programs in operation should be necessary during initiation. In this invention, interrupt structure of single machine is used so that the program being interrupted can be easily protected. It is also beneficial to compatibility to single machine structure. Thus, call Sub SN device will appear sectionalized paths of "N+1 interrupt produced by call position" and "sequence net produced by N+1 interrupts".

Interrupts of the computers are interconnected by bus 306. An interrupt signal on bus 306 will send interrupt requests to all computers, and interrupts of N+1 computer programs 107 are generated. When these interrupt vectors represent various branches of the same sequence net, N+1 interrupt programs realize the call of Sub SN.

FIG. 3C is the structural schematic of interrupting call Sub SN branch programs. N+1 computers operate N+1 programs, as indicated by 310, 311, 312, and 313. Upon receiving signal from interrupt line 306, they produce interrupt programs 320, 321, 322, and 323 individually. Since programs 320, 321, 322, and 323 composed a sequence net and also because of the principle that sequence net can perform independently its operations, the call sequence net can be realized as soon as the parallel interrupt are entered. When the interrupt occurs, the original programs 310, 311, 312, and 313 keep the program states at the point of interrupt. After the branch programs of sequence net are ended, the return instruction restores the original N+1 programs 310, 311, 312, and 313 and the programs are going on again. In the figure, Ps, P1, P2, and P3 are symbolized with same symbol for the reason that they are the program of the same computer.

In fact the computer interrupt vector is a kind a short resources. In applications, Sub SN needs huge amount of numbering space that can not be supplied by interrupt vector space. Therefore the procedures from interrupt to execution of sequence net should be improved. In this invention, the method used is as follow. Before interrupt, the call parameter is broadcasted in call bus device 304 and each single machine interrupt program can read call parameters from call bus device 304. Interrupt bus 306 is connected to fixed interrupt vector and enters fixed interrupt program. Interrupt program reads call parameters and transfers them to sequence net entry address indicated by call parameter. After N+1 interrupt program completed such operations, system is entering into sequence net operation.

After Sub SN is initiated by parallel interrupt, a hardware 304 is needed to call Sub SN which can connect single machine call instruction and parallel interrupt. With the aid of this hardware, a sequence net call instruction can be transformed to the interrupt of N+1 programs.

FIG. 3D is the diagram showing the relation between call Sub SN device and programs. FIG. 3D is another method of describing the structural functions of FIG. 3A. In FIG. 3D, the concept of understanding the structure is rather easier to visualize as the call Sub SN device, sequence net call instruction, and programs are described simultaneously. Call Sub SN device is composed by both software and hardware.

The operating procedure from sequence net call instruction to Sub SN branch programs can be separated to six parts, as indicated by Roman numerals in the figure. They are, I for call request, II for call initiation, III for call contention, IV for call parameter and interrupt, V for producing sequence net entry port, and VI for sequence net program. In this figure, the state descriptions for various phases of N+1 programs clearly indicated the structural feature of call Sub SN device of this invention. Among which, two sections of programs borne with the same numbers of 310, 311, 312, and 313 are used to represent the states of call request phase and receiving interrupt phase. The same numbers of Ps, P1, P2, and P3 indicated the programs in the same computer.

1. The first phase of call of sequence net is the call request phase. Sequence net call instruction is in the format of single machine instruction. In multiple machine environment, any program in programs 310-313 can exist in sequence net call instruction to initiate call Sub SN device. As indicated in the figure, both the sequence net call instruction 319 of program 311 and sequence net call instruction 318 of program 313 produce simultaneously the initiation level. It enters to call bus device 304 for processing. Single machine itself has no sequence net call instruction, and extension of instruction is needed. Among various methods of extending single machine instruction, method directly designed in CPU is the best. In the implementation example of this invention, the reform of IO instruction was used. The reform method is to assign IO address for sequence net call instruction and explained by hardware structure of IO equipment. For example, during the write-operation of IO instruction of sequence net call parameter, it can also be defined as sequence net call instruction. Then, this instruction will produce call initiation during the write-operation of sequence net call parameter.
2. The second phase of sequence net call is call initiation phase. Decoded by hardware of IO equipment, sequence net call position in sequence net call instruction produces a initiation level which is sent to call bus device 304 via call initiation bus 402. If there are multiple call initiations, they will be merged into one at the initiation bus 402. The call initiation bus realized the number extension of from 1 to N+1. The call initiation phase occupied one clock beat H0.
3. Third phase of sequence net call is the call contention phase. When multiple initiation levels appear at the same time (as 318 and 219 in the figure), call contention occurs. Call contention is realized in call bus device 304. During the call contention phase, a valid call will be produced by arbitration. Call contention is concluded in the environment of distributed structure and contains operations of information exchange, comparison, and decision making. It occupies one or more clock beats. A rule of priority is needed for call contention. This rule is executed by hardware inside the call bus device 304. In the implementation example of this invention, a simple rule of ordering is used with the principle of smaller number (of machine number) with higher priority. In the figure, the contention arbitration of call bus device 304 decided that sequence net call 319 being valid and at the same time chose the call parameter 317 (from program P1) for the said sequence net call. Call contention phase occupies one clock beat H1.
4. The fourth phase of sequence net call is the phase of call parameter and hardware interrupt. A sequence net call parameter 317 is defined in call contention phase. In this phase, call parameter 317 is broadcasted in call bus device 304, and is stored in port to be readable by interrupt programs for indicate the entry address of sequence net. Meanwhile, under the control of a clock, call bus device 304 sends interrupt signal 316 to computers. Programs Ps, P1, P2, and P3 are interrupted respectively and designated interrupt program is entered. Call parameter and hardware interrupt phase occupies one clock beat Hint.
5. The fifth phase of sequence net call is the phase of producing sequence net entry. After interrupt protection was processed, interrupt programs 320, 321, 322, and 323 read call parameter from bus device 304. The interrupt program explains the call parameter and makes respective program executing interrupt protection and transferring to branch program of sequence net indicated by call parameter. This phase is a software process and merged with sixth phase in the figure.
6. The sixth phase of sequence net call is the execution and return phase of sequence net. After sequence net branch programs 320, 321, 322, and 323 were concluded, it makes computers returning to original program.

The reason of using interrupt structure for sequence net call in this invention is that interrupt is featured with address protection. Simpler processing method of N+1 interrupt return instruction can be used by the return of sequence net call. In this invention, the reason of using interrupt is that interrupt is the open resources of single machine system and that it is easier to develop hardware. Meanwhile, the integrity of single machine resources can be kept and compatible mode of entire system structure entering in new system can be realized.

The call contention phase of this invention will process levels of priority in accordance with the respective weight of computers. In each computer, there is a weight register of this computer whose content can be preset (the different computer can not be the same value of weight). In general, the weight of computer is kept unchanged during operations. There are also comparator components in computers so that the computer with highest weight can be found out. If necessary, the weight of the computer can use the serial number of the computer.

There is a special condition with the protection call position of Sub SN branch program and described below: Call bus device 304 and interrupt connection perform the evolution of sequence net position from 1 to N+1 and position protection of interrupt program. However, for the program used to initiate call, a special situation will occur. That is to say, the call position of sequence net call instruction and the interrupt position of call bus device 304 are two different points in time scale. Of course, these two different time points of call position should be merged into one point in the structure of initiating call program. If it is realized by hardware, then it means that interrupt should be produced before the quit of sequence net call instruction. If it is realized by software, then there should be a software delay after the sequence net call instruction. Since it is not a difficult problem to solve, this invention will give no description on this issue of position merging in statements followed.

FIG. 3E is the flow diagram of call Sub SN device procedures. In this figure, call Sub SN device is described in six phases.

1. When program is going to sequence net call instruction, two parameters, call parameter and call position are resolved out.
2. Call position produces initiation level which is entering call initiation bus.
3. Call contention process, a call is arbitrated valid.
4. Valid call parameter broadcast is designated, meanwhile 1+N parallel interrupt levels are produced.
5. N+1 interrupt programs read respective call parameter. After being interpreted, the programs are transferred to entry of sequence net.

6. Sequence net is realized by driving of N+1 programs, Interrupt return instructions of various branches quit.

Wherein from 1 to 5 are call procedures of sequence net. Whose input is single machine call instruction of embedded original program. The output is the entry vector of N+1 sequence net. Procedure 6 is the execution part of sequence net.

The partitioning way indicated in the figure is that 1 is single machine execution, from 2 to 6 is parallel execution of entire system. Another partitioning way indicated in the figure is that from 1 to 4 is the hardware structure part of call Sub SN device, from single call position of source program to broadcast call parameter and interrupt level produced. From 5 to 6 is the software of call Sub SN device. In the implementation example of FIG. 4, this invention described the hardware implementation structure of call Sub SN device with procedures from 1 to 4.

FIG. 4A is the structural diagram of sequence net call system SNCS. FIG. 4A is an example illustrating the hardware implementation example of FIG. 3A or FIG. 3D. In procedures 1 to 6 of FIG. 3E, procedures 5 to 6 are entering interrupt program software. The hardware structure design of FIG. 4A is from sequence net call instruction to the conclusion of call parameter broadcasting (to make interrupt program readable) and producing level required for hardware interrupt, i.e. the procedures 1 to 4 of FIG. 3E. Obviously, it is equivalent to call position 300 and call bus device 304 of FIG. 3A.

In order to adapt the situation of ultra larger scale integrated circuits development, the hardware of implementation example of this invention should be featured with distributed and conformal characteristics. For the sake of keeping compatibility of entire single machine structure, the single machine resource occupied by this implementation example must be the opening resources of single machine structure.

This implementation example is composed of N+1 units. Each unit contains a computer 400 and a sequence net call device SNCD 407. Wherein computer 400 could be of different structure, but SNCD device 407 must be of the same structure. Each SNCD device as the peripheral equipment of computer is connected to IO bus 405 of the computer. All SNCD devices are interconnected by a set of bus, wherein a call initiation bus (initiation bus, in brief) 402, a set of data bus (16 buses in this implementation example) 404, and a shared clock line 403 are included. With the aid of shared clock line 403, all SNCD devices 407 can cooperate under beats of one clock.

After sequence net call instruction of a computer program 400 was executed, SNCS 406 goes into operation until call parameters for all computer 400 and output interrupt level INT 408 is on. Hence, sequence net call system SNCS 406 is corresponding to call position 300 and call bus device 304 of FIG. 3A. As stated above, each computer will transfer to interrupt program when interrupt signal arrived. Interrupt program reads sequence net call parameter from individually matched SNCD device 407 and after explanation was made, it transfers to sequence net operation. Sequence net call system SNCS 406 of this implementation example is hardware, and not including those software processing parts such as interrupt program and interrupt return instruction.

Both data bus 404 and initiation bus 402 are "or" bus structure. The "or" bus structure is so characterized that multiple SNCD device 407 can simultaneously send data to bus and "or" bus is also a way of manipulation. For example, for a structure of one bit for each SNCD, a entire system information of 16 computer can be generated in one beat by 16-bit data bus 404.

Sequence net call system SNCS 406 is distributed in structure. Each SNCD device 407 is independently interfaced to local computer 400.

In this implementation example, SNCD device 407 as a peripheral equipment is connected to computer, including peripheral bus 405, and interrupt line INT408 of a set of computer. In peripheral equipment, bus 405 is composed of address bus A, data bus D, and control bus C. For personal computer, this set of bus may be ISA or PCI. For structure of non-peripheral bus, the bus may be memory bus of personal computer.

The operating principle of the implementation example based on the fact that computer 400 operates under sequence net call instruction, and send a sequence net call parameter and a sequence net position signal to SNCD device 407 via bus 405. SNCD device 407 send out a initiation level which propagates on initiation bus 402. All SNCD device 407, upon detecting the initiation level, individually enters in H0 beat at the same instant. In next H1 beat, each SNCD device 407 enters into call contention phase. A valid call request SNCD device 407 is produced in call contention phase. Then, in next Hint beat, sequence net call parameter of valid call SNCD device 407 is broadcasted in SNCS system 406. Each SNCD device 407 reads and stores the call parameter for read operation of computer interrupt program. Meantime, interrupt level 408 produced by various SNCD device 407 is sent to respective computer 400 and the computers enter into interrupt program.

In the implementation example, the sequence net call instruction is in single machine instruction format. When it is realized sequence net call instruction by computer IO instruction, computer IO address is occupied. When specific IO address is used by computer to do write call parameter operation, in addition to storing sequence net call parameter, SNCD device will also recognize IO address as sequence net call instruction, and send initiation level to initiation bus 402. Obviously, sequence net call instruction is not traditional single machine instruction. It uses single machine IO read/write instruction, and via a series of operations, presents then a traditional call concept in users programming interface.

Distributed structure described by this invention has N+1 elements, it is the number of programs operated by the sequence net. In fact on the call structure, there is no constraint on number of programs. In previous patent of sequence net invention, N+1th program as hardware is designed as constructed by N distributed cell of same structure, and the N+1th program is produced cooperatively by N Cells. Therefore, in fact there are 2N (program) structures. Actual call of Sub SN device also processes at the same time the structure of 2N (program) interrupt. The reason of describing this invention by N+1 programs is that: program of N Cells is operated in synchronization and shares a program code. The parallel interrupt of their hardware is also synchronized, just like the process of single interrupt. N interrupt programs also share a program code and operate in synchronization. Therefore, the actual process is just the same as the interrupt of one program.

FIG. 4B is the structural diagram of sequence net call device SNCD. The internal structure of SNCD device 407 includes four devices, call request device CRED 410, call contention device CMPD411, call parameter and interrupt device C&RD412, and register and comparator device R&CD413.

There are three 16-bit registers inside R&CD device 413, call parameter register VECT, weight register of this computer LOCW, and temporary register TMP. IO instruction of computer 400 can write/read registers. Under the control of devices 410, 411, and 412, registers can also write/read data bus 404. Inside R&CD device 413, there is also a comparator COMP. The output of comparator is sent to CMPD device 411 via 415.

Call parameter is a 16-bit (or 15-bit, 14-bit) data used to indicate entry address of sequence net. It is stored in call parameter register. In weight register of this machine LOCW, each bit represent one weight. There are 16 weights in total. Two weights in various devices should not be the same. TEMP is a temporary register to store various data in different times.

CRED device 410, CMPD device 411 and C&RD device 412 are used respectively in request phase, call contention phase, and management of call parameters and interrupt phase. These three phases are connected successively in time.

CRED device 410 is operated locally. It receives via 405 the sequence net call instruction of computer and at the next clock beat produces and sends an initiation level to initiation bus 402

Meanwhile, at every clock beat, all CRED device 410 is going to initiate bus 402 test. Once initiation level is appeared on bus 402, current beat is defined immediately as H0 beat. Hence, at next beat H1 all CMPD device 411 can simultaneously enter into contention phase.

In call contention phase, CMPD device 411 realizes control function to arbitrate so that the call with highest priority should be valid. Priority of every computer was preset in the register of this machine LOCW of R&CD device 413. The valid CMPD device 411 outputs a signal, 414=1.

Controlled by clock beat, CMPD devices of all SNCD device 407 are in cooperation in one clock beat H1 to perform operations of call contention phase. The process is as follows:

At the upper half beat of H1, if CRED device 410 sent initiation level at H0, under the control of CMPD device 411, the content of weight register of this machine is sent to data bus 404. If multiple CRED device 410 sent initiation level at H0, then multiple weights of machines are doing "or" operation at data bus 404. At the leading edge of 2nd half beat of H1, under the control of CMPD device 411, the data on data bus 404 is sent to temporary register TMP and compares immediately with the highest valid bit(=1) of register (hereafter briefly as HVBOR) of weight register content of this machine in the comparator device. The result of comparison is sent to CMPD device 411 via 415. If the HVBOR are equal, it indicates that the call of this SNCD device is valid, the output line 414 of CMPD device 411=1.

The Hint beat controlled by C&ID device 412 is appeared behind H1 beat. C&ID device 412 will decide the source of sequence net call parameter, in accordance with the information of line 414. Broadcasting of call parameter is performed in one clock beat of Hint cooperation of all C&ID devices of SNCD device 407. The process is described as follows:

At the upper half beat of Hint, the C&ID device 412 which had been decided as the source controls the call parameter register VECT and call parameter is sent to data bus 404. At the leading edge of 2nd half beat of Hint, all C&ID device 412 controls the call parameter of data bus 404 and call parameter is sent to temporary register TMP. This is the process of calling call parameter in sequence net.

Data of temporary register TMP can be read via bus 405 by computer instruction. Hence, in the period of Hint, call parameters of sequence net are prepared for every interrupt programs.

At the 2nd half beat of Hint, each C&ID device 412 sent interrupt level 408 to computer. The computer enters into interrupt program. There is no relation existed in the appearance of interrupt level with results 415 and 414 of H1 of Hint. Once a signal appeared on initiation bus 402, the interrupt level will definitely occur.

Regarding the call request mask, since the beginning of call request, each SNCD device enter into a state that is capable to mask new sequence net call instruction. The deactivation of mask will be done after the call parameter of TMP was read by interrupt program. Thus the accuracy of call parameter read by interrupt program is ensured.

Multiple sequence net call instructions occurred at the same beat. System enters contention of machine weight, higher weight of machine is in priority. Sequence net call instruction at different beats is masked; it is the priority in time sequence. Call mask starts at H1, i.e. if one beat difference in time sequence, it is the processing in time priority.

The weight of machine in this implementation example has 16 levels of priority which are stored in 1 16-bit register LOCW. Each bit of register LOCW represents one weight (=1). One computer occupies one bit. If multiple weights of this machine are sent to data bus 404, more than one bit of the 16-bit register are in "1" state. This fact represents all weight information of this machine participating in call contention. Each SNCD device reads the information and makes comparison so that the priority of its own can be decided.

FIG. 4D is the flow diagram of sequence net call device SNCD. Flow diagram of sequence net call device is arranged in accordance with the time sequence of clock beats H0, H1, and Hint. In the table, the working content at each clock beat is indicated in detail. The first line of the table is the phase separation of sequence net call described before. The second line is the title of clock beat. In line 3, "1" and "0" represent the level of the clock beat and in this table "1" represents the first half of the beat and "0" represent the 2nd half of the beat. The fourth line indicates the SNCD device of sequence net call that will get valid call during contention and contains working contents in each clock beat. In line five, there is SNCD device of sequence net call that will be failed during contention and contains working contents in each clock beat. Line six is the SNCD device being not involved with call operation, and contains other working contents in each clock beat.

In the flow diagram, the operation of call Sub SN device is as follows. In executing call instruction, this SNCD device receives sequence net call instruction from computer. In SNCD device, the sequence net call instruction is resolved to call position and call parameter. Call position produces call initiation level.

As indicated in line 4 and line 5 of the table, in first half beat of H0, 2 SNCD devices sent initiation level to initiation bus 402. They merged to one initiation level at the "or" bus 402 and the initiation level is propagating to all SNCD devices.

Initiation bus 402 is tested at the leading edge of 2nd half clock beat by SNCD devices. Once an initiation level was found, then this clock beat is immediately defined as clock beat H0. The next clock beat is the call contention phase H1. Beginning from H1, these SNCD devices start to cooperate.

At the first half of H1, the SNCD device that sent initiation level at H0 is sending the content of weight register of this machine of SNCD device to data bus 404. As indicated in line 4 and line 5 of this table, two weights of machine that were sent by two SNCD devices are going to "or" operation on data bus 404. The sum of multiple weight of machine produced on data bus 404 is called the weight of entire system.

At the leading edge of 2nd half clock of H1, under the control of SNCD devices, the weight of entire system appeared on data bus 404 is written into temporary register TMP. Then, the SNCD device sending out initiation level at beat H0 compares immediately the HVBOR of temporary register TMP with weight of this machine. If the result of comparison is same, as indicated in line 4 of this table, the call of the SNCD device should be valid. If the result of comparison is different, as indicated by line 5 of this table, the call of this SNCD device is invalid.

At Hint beat, two independent jobs will be done. One is to send out interrupt level for hardware. Another is to broadcast call parameter.

At 2nd half beat of Hint, the interrupt levels sent by SNCD devices are sent to the computer connected with the SNCD device.

At first half beat of Hint, the valid SNCD device produced at H1 contention is sending the content of parameter register VECT to the data bus 404, so that the broadcasting of call parameter is realized. As indicated in line 4 of this table, only one SNCD device is sending data to data bus 404.

At the leading edge of 2nd half beat of Hint, under the control of SNCD devices, the content of data bus 404 is written into temporary register TMP. The content of temporary register is hold until the call parameter in register TMP is read by interrupt program.

Now, the hardware process of call Sub SN device is concluded.

FIG. 4D is the cooperative control process of CRED device. CRED device 410 receives call instruction from computer and sends a H1 signal for cooperative control. In the diagram, the double line represents the working signal, and the device module in non-operating mode is bypassed.

Call request device CRED 410 consists of an address decoding device ADDR 428 and a H0 testing device HTST 429. In the figure, CRED device 410 (at the left SNCD) receives call instruction from computer bus 405. The call parameter of instruction is written in the call parameter register VECT of R&CD device 413. Meanwhile, address decoding device ADDR 428 decodes the address and an initiation level is produced. At the beginning of next beat, the initiation level 420 is sent to initiation bus 402. The width of initiation level is equal to one clock beat. The initiated signal 420 is sent simultaneously to the CMPD device 411.

The H0 testing device of all SNCD devices tests initiation bus 402 at the leading edge of 2nd half beat of each beat. If there is initiation level on bus 402, then this clock beat is defined immediately as H0 and the cooperative clock H1 of next beat is sent to CMPD device 411.

FIG. 4E is the cooperative control process of CMPD device. CMPD device receives initiation signal 420 and cooperative clock signal H1 from CRED device. The contention of entire system is compared. At last, a call valid signal 414 and the cooperative clock Hint of next beat are sent to C&ID device 412. The double line in the figure indicates the working signal, and the device module in non-operating mode is bypassed.

Call contention device CMPD 411 consists of a contention decision device VALD 430 and a control signaler RCTL 431.

In the condition of initiation level 420 was sent out by this SNCD device, as indicated in the left of this figure, at the first half beat of H1, control signaler RCTL 431 send out signal 432 to the register of weight of this machine LOCW. The LOCW is to be sent to data bus 404 via 434. Meanwhile, in accordance with H1 signal, devices RCTL 431 send out signal 433 to control temporary register TMP. So that at the leading edge of 2nd half beat of H1, the data on data bus 404 is locked by TMP.

Data in TMP is the weight of entire system in the contention. The weight is sent to comparator device COMP via 435 at the 2nd half beat of H1. Meanwhile, weight of this machine LOCW is also sent to comparator device COMP of device 413 via 436. The result obtained from comparison is sent via 415 to the contention decision device VALD 430 of CMPD device 411. Contention decision device VALD 430 reads the comparator signal 415 from R&CD device 413, and sends signal at next beat to C&ID device 412.

In accordance with signal H1, device RCTL 431 sends cooperative clock Hint of next beat.

In the contention condition of multiple SNCD devices, the operation of each SNCD device is the same as the operation of the left side device in the figure. However, content of the signal 415 sent out by the comparator device COMP of device 413 is different.

In the condition of no initiation level 420 sent out by this SNCD device, as indicated in the right side of this figure, in accordance with signal H1, device RCTL 431 sends signal 433 at H1 beat to control temporary register TMP. So that at the leading edge of 2nd half beat of H1, data on data bus 404 is locked by TMP. In accordance with signal H1, device RCTL 431 sends out the cooperative clock Hint of next beat.

FIG. 4F is the cooperative control process of C&TD device. C&ID device receives call valid signal 414 and cooperative clock signal Hint from CMPD device, and is broadcasting the call parameter and sending out interrupt level. The double line in the figure indicates the working signal, and the device module in non-operating mode is bypassed.

Call parameter and interrupt device 412 includes one interrupt level generator INTT 445 and a control signaler CTLR 446. Upon receiving Hint signal, interrupt level generator INTT 445 sends out interrupt level 408 to the computer.

Control signaler CTLR sends out control signal of call parameter broadcasting. In the Hint beat, if input 414=1, as indicated in the left side of the figure, the call is valid, Device CTLR 446 sends out control signal 447 to control call parameter register VECT. So that at the first half beat of Hint, call parameter register VECT sends out via 449 call parameter to data bus 404. If 414=0, as indicated in the right side of the figure, then no data is sent.

According to signal Hint, devices CTLR 446 send control signal 448 to temporary register TMP. So that at the leading edge of 2nd half beat of Hint, temporary register TMP can lock the data on data bus 404. This data is the call parameter and is related to the entry address of sequence net.

FIG. 4G is the structure of register and the comparator device COMP of comparison device. In this figure, comparator COMP of R&CD device 413 is described. The structure of HVBOR comparison between weight of entire system (in TMP) and weight of this machine (LOCW) is also shown.

At the leading edge of 2nd half of H1, temporary register TMP locks the weight of entire system on data bus and enters immediately the comparison with the weight of this machine LOCW. If the HVBOR are equal, the call is valid.

16-bit output 439 of temporary register TMP is sent to device 435, the device for keeping HVBOR. Output 444 from 435 and the output 438 from register of weight of this machine are sent to data comparator 436. The output 415 of data comparator 436 in identical condition is sent to CMPD device 411.

The circuit structure for keeping HVBOR is a simple processing circuit 435. It has 16-bit input D and output Q. As indicated in the figure, in the serial D0, D1, D2, ... D15, if "1" appears in any digit (e.g. D1), then the Q output of all digit succeeding to that digit (such as Q2-Q15) will be "0". Only one digit, such as Q1 is "1".

The priority order of D0, D1, D2, ... D15 is just the order of this implementation example. Any different order of priority is possible for different cases.

COMP also contains other modes of register data comparison. Since comparator of different types and design could be found in standard software archive, it will not be discussed in this document.

With the statement on above mentioned structures and processes, the structures and procedures including read/write control of register in each beat and the control and transmission path of time sequence realizing call of Sub SN by SNCD is fully described and illustrated. The further design is the control of reads/write operations of registers in different beats and the simple logic for realization. An eligible hardware design engineer acquainted with EDA design can be able to design SNCD device in FIG. 4A, B, C, D, E, and F. A software engineer can also design interrupt programs.

Call Sub SN device has been described above in this invention. The application modes of call Sub SN device will be developed from FIG. 5 and hereafter.

FIG. 5 is used to state the grade call and sequence call of sequence net. On the basis of call Sub SN device, this invention is to categorize further the sequence net call request and to create two new modes of sequence net call request. They are grade call and sequence call of sequence net.

Grade call request and sequence call request are new conditions added to the process of "call instruction—call initiation level". If the condition was not satisfied, then no sequence net call will occur. If the condition is satisfied, sequence net call can be initiated. When sequence net is initiated, the H0, H1, Hint described in FIG. 4 shall all be adjusted accordingly. The adjustments for grade call and sequence call are different. Of course, all logic will be merged at last and a structure of SNCD 407 will be formed.

At the Hreq beat of sequence net request phase, the operations of grade call and sequence call are the check for executing conditions of grade call and sequence call inside SNCD devices 407. When the conditions are satisfied, SNCD device 407 can send out initiation level to initiation bus 402.

Call request of sequence net was introduced in this invention which can support the capabilities of processing external events with different levels of importance and real time response of sequence net. This invention introduced in the sequence call request of sequence net which can support program processing of ordered events and support complicated program structure.

FIG. 5A is the structure of sequence net grade call of this invention. The basics of sequence net call is the concept of "grade property" of sequence net. The principle is that each sequence net has a grade. The grade should be notified during grade call request. When the request is successful, the request grade will enter in as the sign of system grade (in short, system grade as SYSJ). Request grade call instruction and write request grade instruction come from the same program. After sequence net grade call was applied, SYSJ compares with request grade. The principle of comparison is that if request grade is higher than SYSJ, then grade call request is approved and initiation level is produced. If request grade is equal to or lower than SYSJ, grade call request is not approved and no initiation level is produced. If Sub SN of grade call concludes its operation, the HVBOR of SYSJ should be quitted (set zero). Grade call of sequence net establishes the grade feature of multiple machine system.

This figure described the structure for supporting sequence net grade call. It is also an implementation example of SNCD device shown in FIG. 4A and 4B. As compared with the process of FIG. 4B, one step of checking grade call request is added on in this implementation example. As this new step is a local operation and should be processed before the call initiation level. Hence, this step is located in phase I. A procedural relation of "grade call instruction—grade request approval—sequence net call initiation level" is formed in phase I. In other phases of II, III, IV, Y, and VI, the structural relation is kept unchanged. However, the process for a newly add-in request grade parameter needs an add-in of contention between "same beat request for multi-machine with the same highest request grade". So in contention phase, two beats, H1 and H2 are needed.

Structurally, as compared with FIG. 4B, structure of four modules is still kept. Wherein CRED device 410, CMPD device 411, C&RD device 412 are used respectively in request phase, call contention phase, and management of call parameter and interrupt phase. These phases are connected together in time axis. However, inside the modules, following changes are observed:

In R&CD device 413, two registers system grade SYSJ and request grade PJB are added in. A comparator structure of PJB greater than SYSJ is added in the comparator device COMP of device 413. The result of comparison is sent to CRED device 410 via 501. A comparator structure of HVBOR of temporary register equal to request grade register PJB is added in. The result of comparison is sent to CMPD device 411 via 502. In EDA design, there are standard modules available for these comparators.

In CRED device 410, the approval process of request grade is added in. A beat Hreq is add In CMPD device 411, two beats H1 and H2 are formed to process the call contention of request grade.

Internal structure of C&ID device is kept unchanged.

Grade call instruction of sequence net is in the instruction format of single machine. The instruction is the IO instruction of computer. Address of IO should be occupied for the input of grade call parameter. Grade call instruction parameters are "request grade of grade call" and "call parameter of sequence net". In this implementation example, request grade is prior to parameter in writing into PJB register of SNCD device. In writing "call parameter" (at the same time as grade call instruction), address decoding makes CRED device 410 entering into grade request check.

A local grade request beat Hreq is added in to perform grade approval check/ The content of grade approval check is to compare the sizes of "request grade PJB" and "system grade SYSJ". If PJB is higher than SYSJ, an approval signal 501 is produced and sent to CRED device 410. So that during writing "sequence net call parameter", CRED device 410 produces initiation level and sends to initiation bus 402. If request grade is equal to or lower than SYSJ, approval signal 501=0. During writing "sequence net call parameter, no initiation level is produced.

Since the validity of grade call request should be determined prior to the initiation level, register SYSJ should be with distributed structure and be with consistency in distributed content. In this implementation example, system grade register SYSJ is represented by number of bits. SYSJ register of 16-bit represented that the system has 16 grades. The excess value of "1" in SYSJ is the successful record of multiple times of sequence net grade call request. Request grade is also represented by a 16-bit data. Each bit represents an request grade. Only one bit can be in the state of "1". SYSJ is featured with refresh capability. Once the grade call of a sequence net is in success, the new HVBOR will be added to the SYSJ register of all SNCD devices. After branch programs of a grade call sequence net are concluded, the HVBOR of SYSJ register quits immediately.

After grade call request is in success, initiation level is sending to all CRED devices 410 at beat H0. In the next beat, it is changed to call contention phase H1.

In conditions of grade call instruction of sequence net appearing simultaneously in multiple programs and their request grade is higher than SYSJ, a grade call valid should be arbitrated in call contention phase. The call contention phase of this invention can be divided into two steps. The first step is to compare the request grades in beat H1. Information transmission is performed by the cooperative control of all request grade call CMPD devices. Requests of multiple grade call are compared in R&CD device 413. The highest grade is sent to CMPD device via 502. The second step is, at beat H2, to compare weights of this machine of SNCD devices of the highest request grade. The CMPD device with highest grade obtained in beat H1 performs cooperatively the transmission of information. Weight of this machine is compared in R&CD device 413. The result of comparison is sent via 415 to CMPD device 411. The weight of this machine is in the register LOCW.

After conclusion of call contention phase, operations are entering into phases of call parameter and interrupt. Broadcasting of call parameter and hardware interrupt are produced. The system is entering sequence net operation.

FIG. 5B is the flow diagram of sequence net call of this invention. The arrangement of flow diagram of sequence net call device SNCD is based on time sequence of clock beats, H0, H1, H2 and Hint. The first line of the table is the phase separation of sequence call net, as described before. The second line is the title of clock beats. In the third line, "1" and "0" represent the level of clock beat. In this table, "1" is used to represent first half beat and "0" represents the 2nd half beat. The fourth line is the SNCD device with grade call request. For its content in various clock beats, the request is valid in the request phase and the call is valid in the call contention phase. The fifth line is SNCD device with grade call request. For its content in various clock beats, the request is valid in the request phase and will be failed in the contention phase as the weight of this computer is failed in contention. The sixth line is SNCD device with grade call request. For its content in various clock beats, the request is valid in the request phase and will be failed in the contention phase as the request grade is lower then others in contention. The seventh line is SNCD device with grade call request. For its content in various clock beats, because the applied grade is lower than the grade of system, so the request phase fails. The eighth line is SNCD device without call request and its content in various clock beat.

In the flow diagram, the operations of call Sub SN are as follows, SNCD device receives grade call instruction from computer and the address is decoded and identified. In the next beat Happ, the request grade (the request grade register of SNCD device had already written in prior to the grade call instruction) is compared with the HVBOR of SYSJ. If the request grade is lower than or equal to current SYSJ, grade call request is not accepted. If the request grade is higher than current SYSJ, grade call request is accepted. This SNCD device will send initiation level at the next clock beat H0. As indicated in the table, there are four SNCD devices are appeared with grade call instruction, but only three SNCD devices have valid grade call request.

At the first half beat of H0, initiation level appears on initiation bus 402. As indicated in the table, all the three SNCD devices send out initiation level. On bus 402 at beat H0, one initiation level is formed by merging these initiation levels and then is propagated to all SNCD devices.

At the leading edge of 2nd half beat of each clock beat, the SNCD devices test the initiation bus 402. Once an initiation level is detected, this clock beat is immediately defined as beat H0, and in next beat H1 contention phase is entered in.

At the first half beat of H1, the SNCD device that sent initiation level at beat H0 is sending the content of request grade register PJB inside the SNCD device to data bus 404. The data bus operates "or" operation. As indicated in the table, three request grade information sent by three SNCD device are processed with "or" operation on data bus 404.

At the leading edge of 2nd half beat of H1, the content of data bus 404 is written into temporary register TMP by SNCD devices. Then, the SNCD devices that sent initiation levels at H0 beat start immediately to compare "HVBOR of TMP with request grade". If the comparison result is equal, it denotes that the call of this SNCD device is valid. In the fourth and fifth lines of this table, there is equal-valued highest request grade, the call in contention at beat H1 is valid.

At the leading edge of 2nd half beat of H2, the HVBOR of temporary register TMP (the content is the request grade of all grade call) is written into the system grade register SYSJ of SNCD device (beside the HVBOR, other bits of SYSJ register are kept unchanged). The new highest grade of the system is recorded.

At the first half beat of H2, the SNCD device that was call valid in H1 beat is sending the content of weight of this machine register to data bus 404. Data bus 404 is a "or" bus, as indicated in the diagram. The data bus 404 performs "or" operation on the information of weight of machine sent by two SNCD devices At the leading edge of 2nd half beat of H2, SNCD devices are writing the content of data bus 404 into temporary register TMP. Then, the SNCD device that was call valid at beat H1 is proceeding the comparison of "HVBOR of temporary register TMP with weight of this machine. If the comparison result is equal, it denotes that the call of this SNCD device is valid. In the fourth line it denotes that the call in contention at beat H2 is valid. After the SNCD with call valid had been resolved, the operations are entering into phase Hint for call parameter broadcasting and interrupt processed by C&ID device.

At beat Hint, two independent jobs should be performed. One is to send out interrupt level for hardware. Another one is to broadcast call parameter.

At the 2nd half beat of Hint, interrupt level is sent by SNCD device to the connected computer.

At the first half beat of Hint, the SNCD device that was call valid since beat H2 (fourth line of this table) is sending the content of call parameter register VECT to data bus 404 so that parameter broadcasting is realized. Only one SNCD device can be sent to data bus 404.

At the leading edge of 2nd half beat of Hint, SNCD devices write the content of data bus 404 to temporary register TMP. The content of temporary register TMP is kept holding until the data in temporary register TMP is read by interrupt program.

To this moment, the hardware processing for sequence net grade call is concluded.

After the conclusion of all branch program of sequence net, the highest grade of system grade register SYSJ quits. The detailed design of hardware may be various. For example, in the N+1th program of sequence net, a new instruction of the quit of highest grade of SYSJ is designed. During this instruction operation, SNCD devices explain the quit information, the HVBOR of system grade register SYSJ is erased synchronously by hardware.

After description for process of above mention flow diagram was made, the functional structure and procedures for sequence net grade call including read/write control of register in each beat, time sequence control, and path control realized by SNCD devices are made clear. Another new content is the comparators of various kinds in COMP that can be found in standard archives. Another matters are the write of HVBOR of SYSJ and the reset of HVBOR. The electric circuit for finding out HVBOR had been described in FIG. 4G Therefore, the next step of design is to design the control of write/read operations for various registers and some simple logic design for different beats. An engineer familiar to EDA design tools can design the grade call structure of sequence net and SNCD devices as described in FIG. 5A and 5B.

FIG. 5C is the sequence net call structure of this invention. Sequence net sequence call is to set up execution sequence between multiple sequence net of same grade property. The principle is that the approved machine number (stored in NEXT register) of next sequence call is designated by the entire system. It is checked during sequence call request. If request is success, the approval is retracted. Because it is possible to produce simultaneously multiple sequence call instructions. This invention is to designate a sequence call approval to process the Call contention. As different from grade call, request sequence call instruction and the designated instruction for next sequence call approval is from different programs.

In this implementation example, NEXT register used to indicate machine number of next sequence call is established in each R&CD device 413. When SNCD device receives a sequence call request (write call parameter), the NEXT register compares with the machine number of this machine LOCN. If the result of comparison is equal, call initiation level is generated, i.e. the system will accept the call request of that sequence. Otherwise, the call request is invalid.

In the previous invention of sequence net computer, N+1th program Ps is a program of entire system. Ps will proceed the revision of NEXT register, to make the machine number of sequence call approval to be written simultaneously in the NEXT register, so that the consistency of NEXT register in the R&CD device 413 of distributed structure can be ensured. Once a sequence call request is success, the content in NEXT register should be invalid. One write operation to NEXT register can activate once the approval of sequence call.

For utilizing program Ps to write in parallel the data into all NEXT register, previous invention was to use 10 write of CECO instruction. This implementation example describes the structure and process of sequence net call, after the parameters had been written in NEXT.

FIG. 5C descried the structure used to support sequence net call, it is also an implementation example of SNCD device shown in FIG. 4A and 4B. Compared with the process of FIG. 4B, a loop of processing sequence call request is added on in this implementation example. Since this new loop is a local operation and should be performed prior to call initiation. This loop is located in phase I. A procedural relation of "sequence call instruction—sequence request approval—sequence net call initiation" is formed in phase I. In other phases of II, III, IV, V, and VI, the structural relation is kept unchanged. however, the newly added sequence call approval parameter requires a decision in call contention phase that if it is the sequence call.

Compared with FIG. 4B, the structure still keeps the structure of four modules. Wherein CRED device 410, CMPD device 411, and C&RD device 412 are used in managing respectively the call request phase, call contention phase, and the phase of call parameter and interrupt. All phases are continuously connected. However, there are some variations:

In R&CD device 413, two right registers are added for NEXT machine number and number of this machine. The COMP device of device 413 is also added with the structure of identity comparison of NEXT machine number with number of this machine. The comparison result is sent to CRED device 410 via 503. An additional electric circuit structure of discriminating the state of all "0" for TMP register is added on. The comparison result is sending to CMPD device 411 via 504. 504=1 means sequence call. The contention occurred in multiple sequence calls had already been finished by one NEXT in entire computers. In EDA design, there are standard modules for these comparison circuits.

In CRED device 410, an approval processing for sequence call is added and a Hreq beat is added.

In CMPD device 511, a beat for discrimination of the type of sequence call is added to identify the types of grade call.

The internal structure of C&ID device 412 is kept unchanged.

The instruction used by sequence call of sequence net is in single machine instruction format. This instruction is the IO instruction of computer and needs the input of sequence call parameter that occupied IO address. The parameters of sequence call instruction are "NEXT" sequence call machine number and "call parameter of sequence net". In this implementation example, during the write operation of "call parameter" which is also the sequence call instruction, address decoding makes CRED device 410 entering into sequence call request procedure.

A local sequence request beat Hreq is added for checking sequence approval. The check for sequence approval is to compare the "NEXT machine number" and the "number of this machine". If the comparison give equal result, an approval signal 503 is produced and sent to CRED device 410. CRED device 410 produces initiation level to initiation bus 402. If the comparison give negative result, no approval signal will be produced. Also no initiation level exists.

Register NEXT is distributed in SNCD devices. The contents should be kept in consistent.

In this implementation example, the machine number is represented by bit. There are 16 bits in number of this machine register, i.e. altogether 16 machine numbers. NEXT machine number is also a data of 16 bits. "1" in the bit represent the approved machine number. In NEXT register, only one bit is allowed to be in "1".

Once a sequence call is success, the NEXT registers in all SNCD devices are reset. Then, a new NEXT is written by N+1th program of previous patent on sequence net computer. The machine number of new next sequence call approval is defined. When multiple sequence calls occur, since there is only one NEXT, hence, contention of sequence call should be concluded in the beat of request phase Happ.

With the conclusion of beat H0, system is entering to call contention beats, H1 and H2.

At the first half beat H1 of call contention phase, controlled by CMPD device 411, SNCD device send all 0 to data bus 404. At the leading edge of 2nd half beat of H1, 0 is written in register TMP of R&CD device 413. TMP content is checked for all 0 inside the R&CD device 413. The result is sending to CMPD device 411 via 504. If 504=1 (indicates all 0 occurred in TMP), CMPD device decides it is sequence call.

H2 operation is blank.

After the conclusion of call contention phase, CMPD device is sending out signal 414 and entering into call parameter and interrupt phase. Both call parameter broadcasting and hardware interrupt signal will be produced. The system is entering into sequence net operations.

FIG. 5D is the flow diagram of sequence net call of this invention. The flow diagram of sequence net call device SNCD is in the arrangement of time sequence of clock beats, Happ, H0, H1, H2, and Hint. The detailed operations in each clock beat are listed. The first line of this table is the phase separation of sequence net call described above in this document. The second line is the title of clock beats. "1" and "0" of third line represent the level of clock beat. In the table, "1" represents the first half beat and "0" represent the 2nd half beat. The fourth line is the SNCD device with sequence call request. For its content in various clock beats, the request is valid in the request contention phase. The fifth line is the SNCD device with sequence call request. For its content in various clock beats, the request phase is failed because of the different number of this machine and machine number of NEXT. The sixth line is the SNCD device without call request, and its contents in different clock beats.

In the flow table, operations of call seb SN device are as follows: SNCD device accepts sequence call request instruction from computer. In next beat Happ, comparison between NEXT sequence call machine number and the number of this machine is made. If the number of this machine and number of NEXT is the same, sequence call request is approved. SNCD device is sending initiation level at next clock beat H0. If the number of this machine is different from that of NEXT, or the content of NEXT is invalid, sequence call request of SNCD device is invalid. As indicated in line 4 and line 5 of the table, two SBCD devices send out sequence call request, but only one is accepted.

At the first half beat of H0, there is initiation level in the call initiation bus 402, as indicated in the table. Only one SNCD device sends out initiation level at beat H0 and the initiation level is propagated via bus 402 to all SNCD devices.

At the leading edge of 2nd half of each beat, CRED devices 410 test initiation bus 402. Once initiation level is detected. This clock beat is immediately defined as H0. Call contention phase H1 is entered in next beat H1.

At the first half beat of H1, the SNCD that sent output level to initiation bus 402 at H0 is sending 0 to data bus 404. In this implementation example, this data of "0" represents sequence call.

At the leading edge of 2nd half beat of H1, all SNCD devices write contents of data bus 404 to temporary register TMP. Then, the content of temporary register TMP is checked for all "0". If the check shows the result of all "0". It indicated that this time the call is sequence call. The fourth line of this table indicates that the sequence call is valid.

After sequence call was identified by check in H1, the operation in beat H2 is blank. Since in request phase only one sequence call can enter in. Hence, SNCD device that sent initiation level at beat H0 is the SNCD device of sequence call valid. Obviously, the sequence call identification at beat H1 is for the purpose of identifying grade call.

At beat Hint, two independent jobs should be performed. One is to send interrupt level to hardware. Another is to broadcast the call parameter.

At the 2nd half of beat Hint, SNCD devices send out interrupt level to the connected computer.

At the first half beat of Hint, the content of call parameter register VECT is sent from call valid SNCD device (fourth line of this table) to data bus 404, so that the broadcast of call parameter is performed. Only one SNCD device can send data to data bus 404.

At the leading edge of 2nd half of beat Hint, SNCD devices write the content of data bus 404 to temporary register TMP. The content in temporary register is kept holding until the data of temporary register TMP is read by interrupt program.

Now the hardware processing for sequence net call of sequence net is concluded.

After the statement on procedures of the above mentioned flow table, the structure and procedures of the call Sub SN that realize sequence net sequence call are made clear, including the read/write control of register in each beat, time sequence control, and path control. Another new job is the various kinds of comparators in COMP, they can be found in standard archives. Hence, the next step of design is to design the control of read/write of various registers and simple logic at different clock beats. An engineer familiar to EDA design tools can design the sequence call structure of sequence net and SNCD devices as described in FIG. 5C and 5D. A software engineer is also capable of designing relevant interrupt programs.

The merge in structure for grade call and sequence call should be inevitable. It is an issue of pure logic combination. Hence, only simple explanation is made in this implementation example as follows:

If grade call and sequence call occurred concurrently, one initiation level is merged on initiation bus 402. As contention of sequence call had already performed before the submission of initiation level. Hence, what is needed is to perform the identification of grade call and sequence call in call contention phases H1 and H2. For the beat Hint, the structure is the same.

As at the first half of beat H1, grade call sends the request grade VECT to data bus 404, whereas for sequence call, 0 is sent. Hence, at the leading edge, the data locked in temporary registers TMP are all 0 indicating sequence call. Otherwise it is grade call. For sequence call, SNCD device for call valid had been defined. For grade call, call contention phase proceeds continuously until call valid SNCD device is obtained. Finally, all of them enter into process of beat Hint.

When grade call and sequence call appeared concurrently, the above mentioned structure of grade call and sequence call indicated the priority of grade call, and also indicated that call contention existed in multiple sequence calls of the same grade. There is no sequence call relation between sequence nets with different grades.

The functions and applications of multiple machine call Sub SN device exceeds that of single machine call subroutine. Call Sub SN device of this invention is one of key technologies of developing utility performance for sequence net computer.

The invention claimed is:

1. A Sub Sequence Net (SN), comprising:
an SN including N+1 branch programs which are run in parallel respectively running on N+1 computers including a Sub SN calling device and more than one distributed data tokens;
wherein each of the distributed data tokens comprises a consistency token instruction, a source data token instruction and multiple target data token instructions, and each of the $1^{st}$ to $N^{th}$ branch programs is composed by one or more source data token instructions and one or more of the target data token instructions, the $N+1^{th}$ branch program is a consistency program which is composed by the consistency token instructions;
wherein each of the N+1 branch programs includes a return instruction, and wherein N is a positive integer; and
wherein a calling instruction of the Sub SN is a single machine SN calling instruction; the call instruction calls the Sub SN by activating the Sub SN calling device.

2. The Sub SN of claim 1, wherein the Sub SN calling device comprises a calling bus device for establishing a connection between a calling position of a single machine and the Sub SN.

3. The Sub SN of claim 2, wherein
the Sub SN calling device is activated by the single machine SN calling instruction;
a calling parameter of the single machine SN calling instruction is broadcasted to N+1 units associated with the N+1 computers and is used as a calling entry address of the N+1 branch programs of the Sub SN;

an on-site protection is performed when each of the N+1 branch programs is entered; and each of the N+1 branch programs is exited by the return instruction.

4. The Sub SN of claim 2, wherein the Sub SN calling device comprises an activating device for transferring the single machine SN calling instruction from a serial single machine to the parallel N+1 branch programs.

5. The Sub SN of claim 2, wherein the Sub SN calling device comprises a call contention device for processing a plurality of simultaneously occurred requests.

6. The Sub SN of claim 2, wherein the Sub SN calling device comprises a device for transmitting a calling parameter from serial to parallel and for activating parallel interrupts.

7. A Sub Sequence Net (SN) calling system for calling the Sub SN according to claim 1, comprising:
   N+1 computers, for running the N+1 branch programs, which are run in parallel, of the Sub SN, wherein the N+1 computers include a Sub SN calling device and more than one distributed data tokens, each of the distributed data tokens in the SN comprises a consistency token instruction, a source data token instruction and multiple target data token instructions, and each of the $1^{st}$ to $N^{th}$ branch programs is composed by one or more source data token instructions and one or more of the target data token instructions, the $N+1^{th}$ branch program is a consistency program which is composed by the consistency token instructions;
   N+1 SN calling devices, for handling call contentions, storing SN calling parameters, and identifying SN calling instructions; and
   a group of buses, for connecting the SN calling devices together, the group of buses comprising:
   a call activating bus, for receiving an activating level sent by one of the SN calling devices;
   a data bus; and
   a shared clock bus.

8. The Sub SN calling system of claim 7, wherein each of the SN calling devices comprises:
   a call requesting device, for receiving an SN calling instruction, generating an activating level at a next clock pulse, and delivering the activating level to the call activating bus;
   a call contention device, for arbitrating a call of a highest priority as valid;
   a call parameter and interrupt device, for determining a source of an SN call parameter based on an output of the call contention device, and sending an interrupt level to an associated computer.

9. The Sub SN calling system of claim 8, wherein each of the SN calling devices further comprises a registering and comparing device, for storing a local weight, and for comparing the local weight with a global weight in order to determine whether the respective SN calling device is the source of the SN calling parameter.

10. The Sub SN calling system of claim 9, wherein the registering and comparing device further comprises a system grade register and a request grade register, when the SN calling device receives a grade calling request, if an output of the request grade register is greater than an output of the system grade register, the registering and comparing device generates a permission signal to the call requesting device, so that the call requesting device generates the activating level to the activating bus, and when the output of the request grade register is smaller than or equal to the output of the system grade register, the registering and comparing device does not generate the permission signal and thus no activating level is generated.

11. The Sub SN call system of claim 8, wherein the registering and comparing device further comprises a sequence calling register indicating a next sequence calling device number, when the SN calling device receives a sequence calling request, an output of the sequence calling register is compared with a local device number, if the comparison result is - the same- , the activating level is generated, otherwise, no activating level is generated.

12. A method for calling a Sub Sequence Net (Sub SN) using the Sub SN calling device of claim 7, comprising the following steps:
   a) one or more SN calling devices receiving one or more SN calling instructions from one or more computers, respectively;
   b) each of the SN calling devices which receive the SN calling instructions sending an activating level via the activating bus to all the other SN calling devices;
   c) when each of the SN calling devices which receive the SN calling instructions detects the activating level on the activating bus, each of the SN calling devices which receive the SN calling instructions sending its local weight to the data bus, then a global weight formed on the data bus being written in a temporary register of each of the SN calling devices; and
   d) each of the SN calling devices which receive the SN calling instructions comparing a highest valid bit of the temporary register with its local weight, if the comparison result is - the same- , the call of the respective SN calling device is valid, otherwise, the call of the respective SN calling device is invalid, at least one call from one of the SN calling devices which receive an SN calling instructions is valid;
   wherein the Sub Sequence Net (SN) comprising: an SN including N+1 branch programs which are run in parallel respectively running on N+1 computers including a Sub SN calling device and one or more distributed data tokens;
   wherein each of the distributed data tokens comprises a consistency token instruction, a source data token instruction and multiple target data token instructions, and each of the $1^{st}$ to $N^{th}$ branch programs is composed by one or more source data token instructions and one or more of the target data token instructions, the $N+1^{th}$ branch program is a consistency program which is composed by the consistency token instructions;
   wherein each of the N+1 branch programs includes a return instruction, and wherein N is a positive integer; and
   wherein a calling instruction of the Sub SN is a single machine SN calling instruction; the call instruction calls the Sub SN by activating the Sub SN calling device.

13. The call method of claim 12, wherein step c) comprises an "or" operation of the local weights sent by the SN calling devices which receive SN calling instructions to form the global weight.

14. The call method of claim 12, further comprising the following step between step a) and step b): at least one computer of the N+1 computers sending a grade calling instruction for supporting different importance grades.

15. The call method of claim 14, further comprising a step of the at least one computer writing a request grade of the called Sub SN into a request grade register of the SN calling device before the at least one computer sends the grade calling instruction.

16. The call method of claim 15, further comprising a step of comparing the request grade with a system grade, wherein if the request grade is lower than or equal to the system grade, then the grade calling request is not accepted, and if the request grade is higher than the current system grade, then the grade calling request is accepted, and the activating level is generated at step b) by the SN calling device.

17. The call method of claim 16, further comprising the following steps between step b) and step c):
- b1) on the activating bus, an "or" operation being performed on the activating levels from the SN calling devices which receive the SN grade calling instructions and the result of the "or" operation being delivered to all the SN calling devices;
- b2) when each of the SN calling devices which receive the SN grade calling instructions detects an activating level on the activating bus, each of the SN calling devices which receive the SN grade calling instructions sending its local request grade to the data bus, then a global request grade formed on the data bus being written into the temporary register by each of the SN calling devices;
- b3) each of the SN calling devices which receive the SN grade calling instructions comparing the global request in the temporary register with its local request grade, and if the comparison result is —the same—, the grade call of the SN calling device is valid; and
- b4) writing the highest bit of the temporary register into a system grade register of each of the SN calling devices so that a new system grade is recorded.

18. The call method of claim 12, further comprising the following step between step a) and step b): at least one computer of the N+1 computers sending a sequence calling request instruction of the SN for supporting sequenced events of a program processing and a complicated program structure.

19. The call method of claim 18, further comprising a step of designating a next sequence calling device number in a next register of each of the SN calling devices.

20. The call method of claim 19, further comprising the following steps between step b) and step c):
- b') each of the SN calling devices receive the sequence calling request instructions from the at least one computer; and
- b") comparing the next sequence calling device number with a local device number, if the comparison result is —the same—, the sequence calling request instruction is allowed and the activating level is sent to the activating bus, otherwise, the device number of the sequence call request is invalid and no activating level is sent to the activating bus.

21. The call method of claim 20, further comprising the following steps between step c) and step d):
- c') the SN calling devices which receive the sequence calling request instructions sending sequence call feature data to the data bus;
- c") the SN calling devices which receive the sequence calling request instructions writing the content on the data bus into the temporary register, and checking the data in the temporary register for determining whether a sequence calling feature is satisfied, if it is satisfied, it is determined there is a grade call, otherwise, it is determined there is a sequence call.

* * * * *